(12) United States Patent
Iwasaki

(10) Patent No.: US 9,551,273 B2
(45) Date of Patent: Jan. 24, 2017

(54) CHARGE AIR COOLING SYSTEM

(75) Inventor: Mitsuru Iwasaki, Sagamihara (JP)

(73) Assignee: CALSONIC KANSEI CORPORATION, SAITAMA-SHI (JP)

( * ) Notice: Subject to any disclaimer, the term of this patent is extended or adjusted under 35 U.S.C. 154(b) by 930 days.

(21) Appl. No.: 13/258,202

(22) PCT Filed: Mar. 15, 2010

(86) PCT No.: PCT/JP2010/054341
§ 371 (c)(1),
(2), (4) Date: Sep. 21, 2011

(87) PCT Pub. No.: WO2010/110111
PCT Pub. Date: Sep. 30, 2010

(65) Prior Publication Data
US 2012/0018127 A1    Jan. 26, 2012

(30) Foreign Application Priority Data

Mar. 23, 2009 (JP) ................................ 2009-069698
Mar. 27, 2009 (JP) ................................ 2009-078574

(51) Int. Cl.
F02B 29/04    (2006.01)

(52) U.S. Cl.
CPC ....... F02B 29/0412 (2013.01); F02B 29/0418 (2013.01); F02B 29/0462 (2013.01);
(Continued)

(58) Field of Classification Search
CPC .............. F02B 29/0412; F02B 29/0418; F02B 29/0462; F02M 25/0737; F02M 25/0732; F02M 26/24; F02M 26/32; Y02T 10/146; Y02T 10/121
(Continued)

(56) References Cited

U.S. PATENT DOCUMENTS 4,236,492 A * 12/1980 Tholen ...................... F01P 3/18
                                              123/563
4,774,812 A * 10/1988 Hitomi .................. F02B 33/446
                                               60/601
(Continued)

FOREIGN PATENT DOCUMENTS

CN        2433417 Y      6/2001
CN      101389839 A      3/2009
(Continued)

Primary Examiner — Thomas Denion
Assistant Examiner — Matthew T Largi
(74) Attorney, Agent, or Firm — Foley & Lardner LLP

(57) ABSTRACT

A charge air cooler includes a high temperature side heat exchanger and a low temperature side heat exchanger. The high temperature side heat exchanger is provided on a high temperature side cooling flow path through which a first refrigerant cooled by a first heat exchanger (radiator) flows. The low temperature side heat exchanger is provided on a low temperature side cooling flow path through which a second refrigerant cooled cooler than the first refrigerant by a second heat exchanger (sub-radiator) flows. The low temperature side heat exchanger cools, by the second refrigerant, intake air cooled by the high temperature side heat exchanger. According to the above charge air cooler, the second heat exchanger (sub-radiator) can be prevented from becoming big in size, and intake air temperature can be cooled to desired temperature.

11 Claims, 19 Drawing Sheets

(52) U.S. Cl.
CPC ............ *F02M 26/24* (2016.02); *F02M 26/32* (2016.02); *Y02T 10/146* (2013.01)

(58) Field of Classification Search
USPC .................... 60/599, 605.2; 123/563, 568.12
See application file for complete search history.

(56) References Cited

U.S. PATENT DOCUMENTS

| | | | |
|---|---|---|---|
| 5,036,668 A | | 8/1991 | Hardy |
| 5,394,854 A | * | 3/1995 | Edmaier et al. ............. 123/563 |
| 6,244,256 B1 | * | 6/2001 | Wall et al. ............... 123/568.12 |
| 6,935,129 B2 | * | 8/2005 | Sasaki ............... B60H 1/00328 60/618 |
| 7,650,753 B2 | * | 1/2010 | Muller et al. .................... 60/599 |
| 7,690,213 B2 | * | 4/2010 | Inaba ........................... 62/238.6 |
| 7,717,097 B2 | | 5/2010 | Guerrero |
| 7,757,679 B2 | | 7/2010 | Joergl et al. |
| 7,779,791 B2 | | 8/2010 | Holzbaur et al. |
| 7,886,724 B2 | | 2/2011 | Tai et al. |
| 8,028,522 B2 | * | 10/2011 | Irmler et al. .................... 60/599 |
| 8,336,528 B2 | * | 12/2012 | Hori et al. ............... 123/568.12 |
| 2005/0034712 A1 | | 2/2005 | Guerrero |
| 2005/0081523 A1 | * | 4/2005 | Breitling et al. ............... 60/599 |
| 2006/0117748 A1 | | 6/2006 | Bundschuh et al. |
| 2006/0185363 A1 | | 8/2006 | Gustafson et al. |
| 2006/0236987 A1 | | 10/2006 | Guerrero |
| 2007/0056282 A1 | | 3/2007 | Iwaszkiewicz |
| 2007/0186912 A1 | | 8/2007 | Holzbaur et al. |
| 2008/0066697 A1 | * | 3/2008 | Raab et al. ................. 123/41.55 |
| 2009/0013978 A1 | | 1/2009 | Joergl et al. |
| 2009/0050117 A1 | | 2/2009 | Tai et al. |
| 2009/0301411 A1 | | 12/2009 | Iwasaki |

FOREIGN PATENT DOCUMENTS

| | | | |
|---|---|---|---|
| DE | 103 17 959 A1 | 11/2004 | |
| GB | 2 057 564 A | 4/1981 | |
| GB | 2057564 A * | 4/1981 | ............... F01B 3/20 |
| JP | 59-145325 A | 8/1984 | |
| JP | 61-167424 U | 10/1986 | |
| JP | 11-200955 | 7/1999 | |
| JP | 2001-248448 A | 9/2001 | |
| JP | 2003-262131 A | 9/2003 | |
| JP | 2005-517857 A | 6/2005 | |
| JP | 2006-522893 A | 10/2006 | |
| JP | 2007-514890 A | 6/2007 | |
| JP | 2008-057950 A | 3/2008 | |
| JP | 2009-530544 A | 8/2009 | |
| WO | WO 2008/041971 A1 | 4/2008 | |

\* cited by examiner

FIG. 14
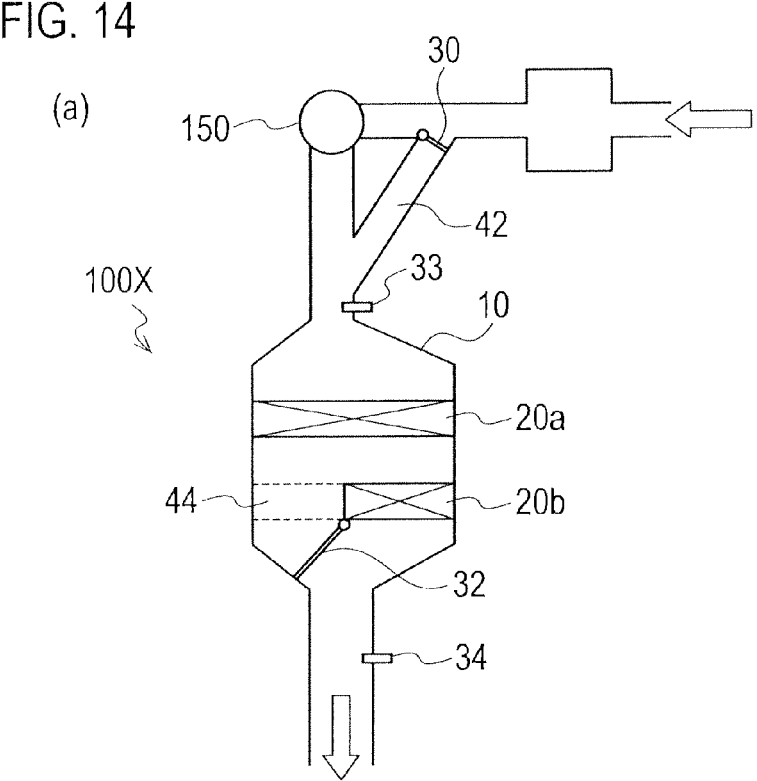
(a)
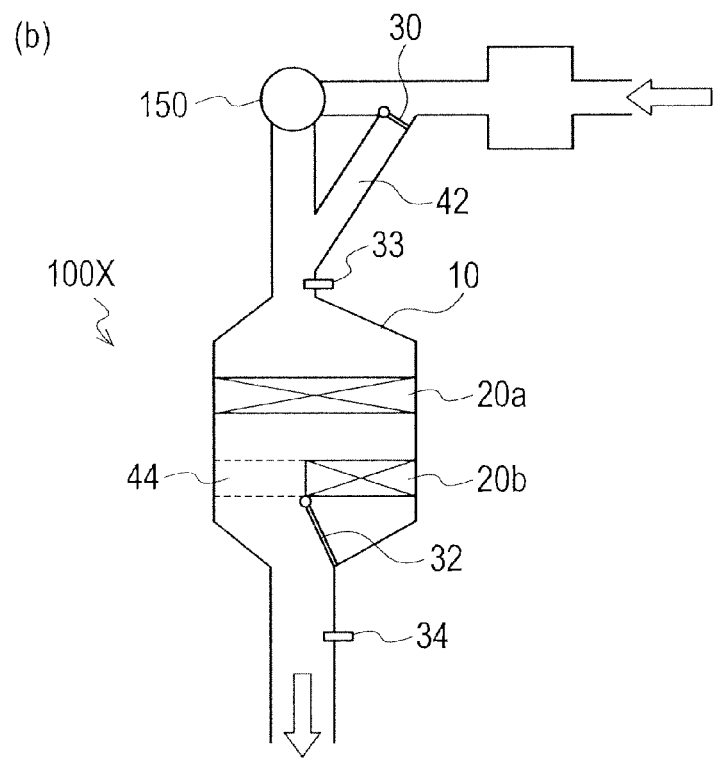
(b)

FIG. 17
(a)
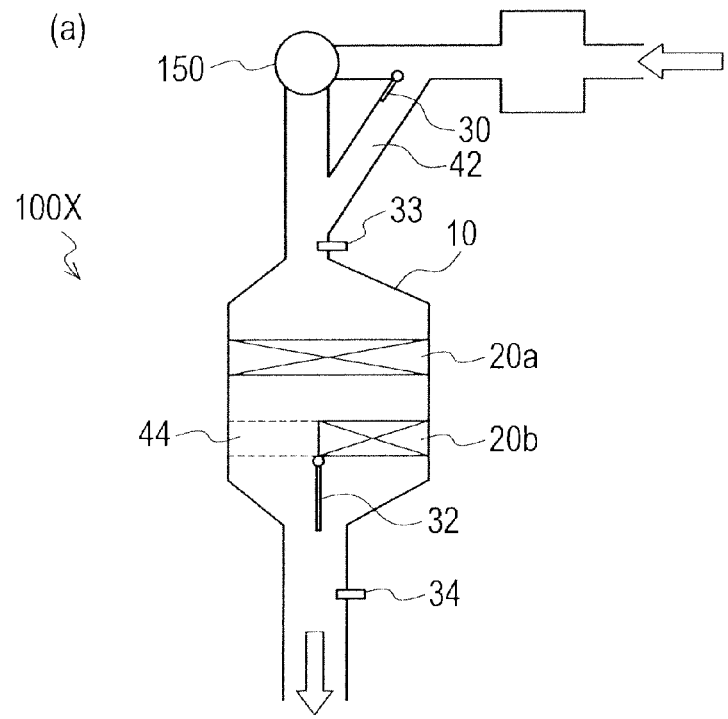
(b)
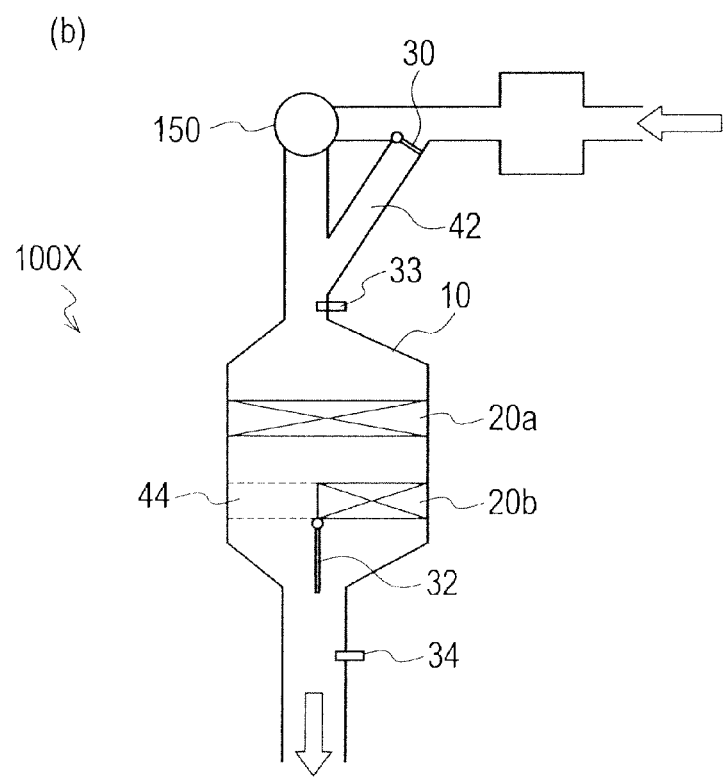

CHARGE AIR COOLING SYSTEM

TECHNICAL FIELD

The present invention relates to a charge air cooler and a cooling system each uses two routes of coolant, and an intake air control system that controls intake air temperature of an internal combustion engine using two routes of coolant.

BACKGROUND ART

Generally, a charge air cooler (an intercooler) is used with an internal combustion engine having a supercharger. When intake air is compressed by the supercharger, intake air temperature increases while this compression process. Since combustion characteristics may get worse due to excessive increase of the intake air temperature, the intake air temperature is reduced by the charge air cooler. Note that, if not specified, a term "supercharger" in the present application means a supercharger in a broad sense including a turbocharger and so on [a supercharger in a narrow sense means a supercharger that does supercharging by utilizing a drive force of a drive source (an combustion engine)].

As a typical charge air cooler, known are an air-cooling type charge air cooler that does cooling by utilizing a flow of outside air involved with a vehicle, and a water-cooling type charge air cooler that does cooling by utilizing refrigerant (coolant, cooling water). Know is a water-cooling type charge air cooler with a structure in which a heat exchanging section that forms a coolant flow path is produced independently and then the heat exchanging section is inserted into a case. By flowing intake air through the case, the cooling water and the intake air exchange heat therebetween.

In a water-cooling type charge air cooler, intake air is cooled by a low temperature side cooling flow path that is provided with a sub-radiator and separated from an engine cooling flow path (a high temperature side cooling flow path) provided with a radiator for cooling an engine. Target temperature of intake air to be supplied to the engine is about 45° C. and that is relatively low. Therefore, intake air cannot be cooled sufficiently by the engine cooling flow path. Consequently, intake air is cooled by the low temperature side cooling flow path.

In order to cool intake air to about 45° C., it is needed that refrigerant flowing through the low-temperature side cooling flow path should be cooled to about 40° C. For cooling the refrigerant to about 40° C., the sub-radiator must be made big in size to enhance its cooling capacity. Since installation freedom degree of the sub-radiator made big in size is restricted, the sub-radiator is generally located in front of the radiator (for example, Japanese Patent Application Laid-Open No. 2006-522893 [Patent Document 1] and Japanese Patent Application Laid-Open No. 2007-514890 [Patent Document 2]).

SUMMARY OF INVENTION

When the sub-radiator made big in size is located in front of the radiator, airflow resistance at a front end of a vehicle increases. Although it is possible to utilize a motor fan in order to improve the airflow resistance at the front end, energy is needed in order to drive the motor fan. Or, if the motor fan is made big in size, burdens on an in-vehicle battery increase.

An object of the present invention is to provide a charge air cooler and a cooling system that prevent a sub-radiator from becoming big in size and can cool intake air temperature to desired temperature.

A first aspect of the present invention provides a charge air cooler that includes a first heat exchanger for cooling first refrigerant; a second heat exchanger for cooling second refrigerant cooler than the first refrigerant; a high temperature side cooling flow path through which the first refrigerant cooled by the first heat exchanger flows; a low temperature side cooling flow path through which the second refrigerant cooled by the second heat exchanger flows; a high temperature side heat exchanger that provided on the high temperature side cooling flow path and cools, by the first refrigerant, supercharged intake air; and a low temperature side heat exchanger that provided on the low temperature side cooling flow path and cools, by the second refrigerant, intake air cooled by the high temperature side heat exchanger.

A second aspect of the present invention provides a cooling system that includes the above charge air cooler, wherein a first EGR cooler is provided on the high temperature side cooling flow path, and a second EGR cooler is provided on the low temperature side cooling flow path.

According to the first and second aspects, a sub-radiator is prevented from becoming big in size and intake air temperature can be cooled to desired temperature.

Another object of the present invention is provide an intake air control system that can control intake air temperature to desired temperature high-responsively.

A third aspect of the present invention provides an intake air control system that includes a charge air cooler according to the above first aspect; a bypass pathway provided on an intake air flow passage downstream of the high temperature side heat exchanger in parallel with the low temperature side heat exchanger; and a thermostatic regulating valve for controlling temperature of intake air to be supplied to an internal combustion engine by regulating a flow rate of intake air that has exchanged heat at the low temperature side heat exchanger and a flow rate of intake air that has flown through the bypass pathway.

According to the third aspect, intake air temperature can be controlled to desired temperature high-responsively.

BRIEF DESCRIPTION OF DRAWINGS

FIGS. 14 (a) and (b) are explanatory diagrams showing operations of a thermostatic regulating valve used in the intake air control system of the embodiment according to the present invention.

FIGS. 17 (a) and (b) are explanatory diagrams showing operations of a switching valve used in the intake air control system of the embodiment according to the present invention.

DESCRIPTION OF EMBODIMENT

Figure 1:
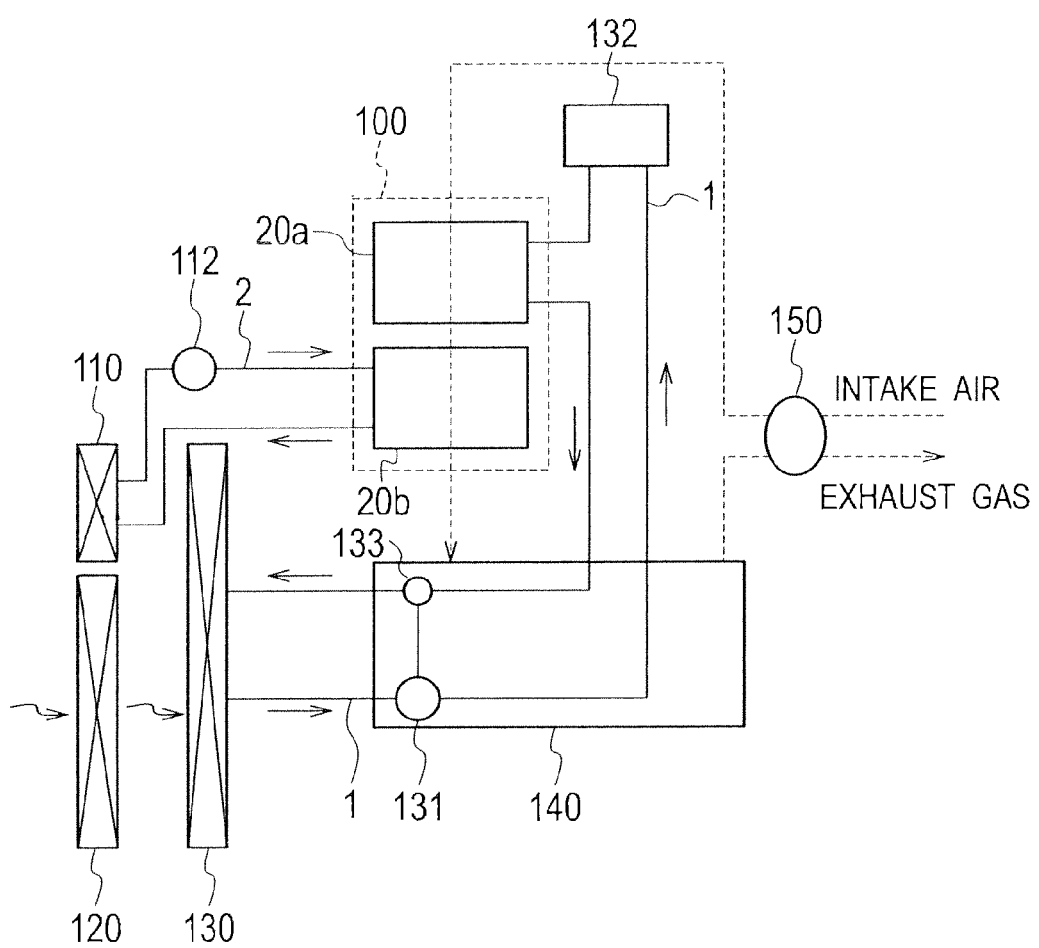
FIG. 1 is a block diagram showing a cooling system using a charge air cooler of a first embodiment according to the present invention (a cooling system of a first embodiment according to the present invention).

An embodiment according to the present invention will be explained with reference to the drawings. In the drawings, identical or similar elements have identical numerals. However, in the drawings, each element is indicated schematically, and its dimension or the like may be different from its actual one. Therefore, specific thickness, dimension or the like should be understood in view of following explanations.

As shown in FIG. 1, a charge air cooler 100 according to a first embodiment includes a high temperature side heat exchanger 20a provided on a high temperature side cooling flow path 1, and a low temperature side heat exchanger 20b provided on a low temperature side cooling flow path 2. The high temperature side heat exchanger 20a is provided on the high temperature side cooling flow path 1 along which a first refrigerant cooled by a first heat exchanger (radiator) 130 flows. The high temperature side heat exchanger 20a cools, by the first refrigerant (first cooling water), supercharged intake air. The low temperature side heat exchanger 20b is provided on the low temperature side cooling flow path 2 along which a second refrigerant cooled cooler than the first refrigerant by a second heat exchanger (sub-radiator) 110 flows. The low temperature side heat exchanger 20b cools, by the second refrigerant (second cooling water), intake air cooled in the high temperature side heat exchanger 20a.

Figure 2:
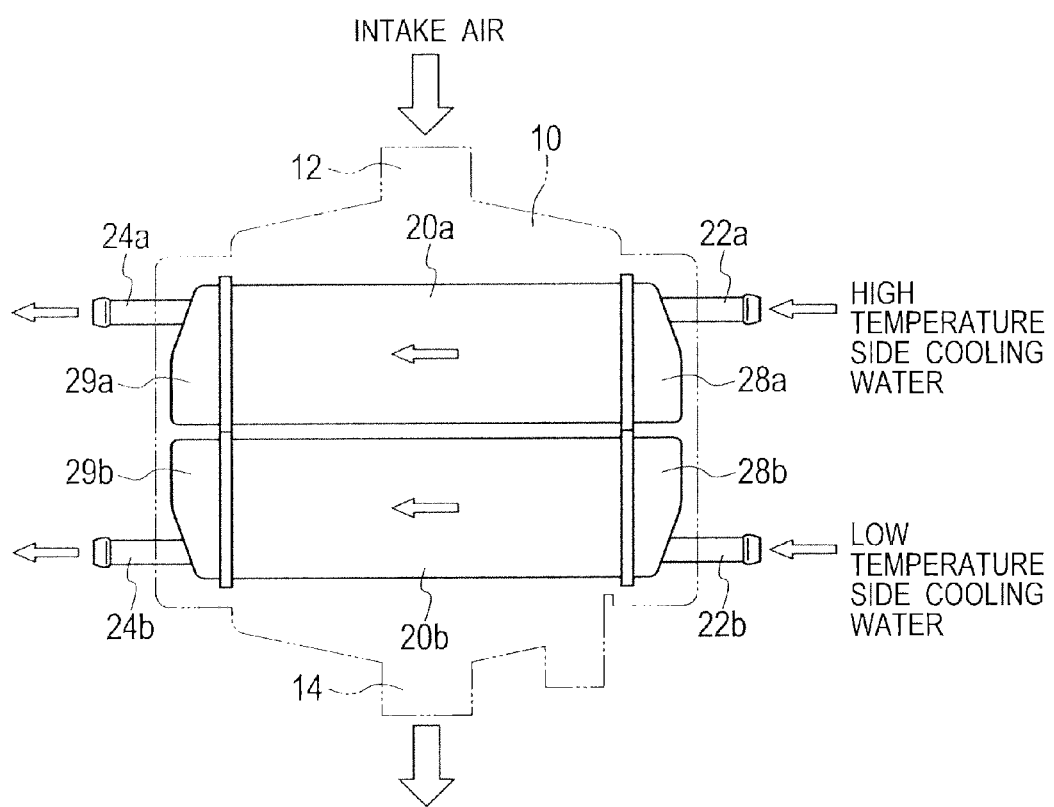
FIG. 2 is a schematic plan view of the charge air cooler the first embodiment according to the present invention.
Figure 3:
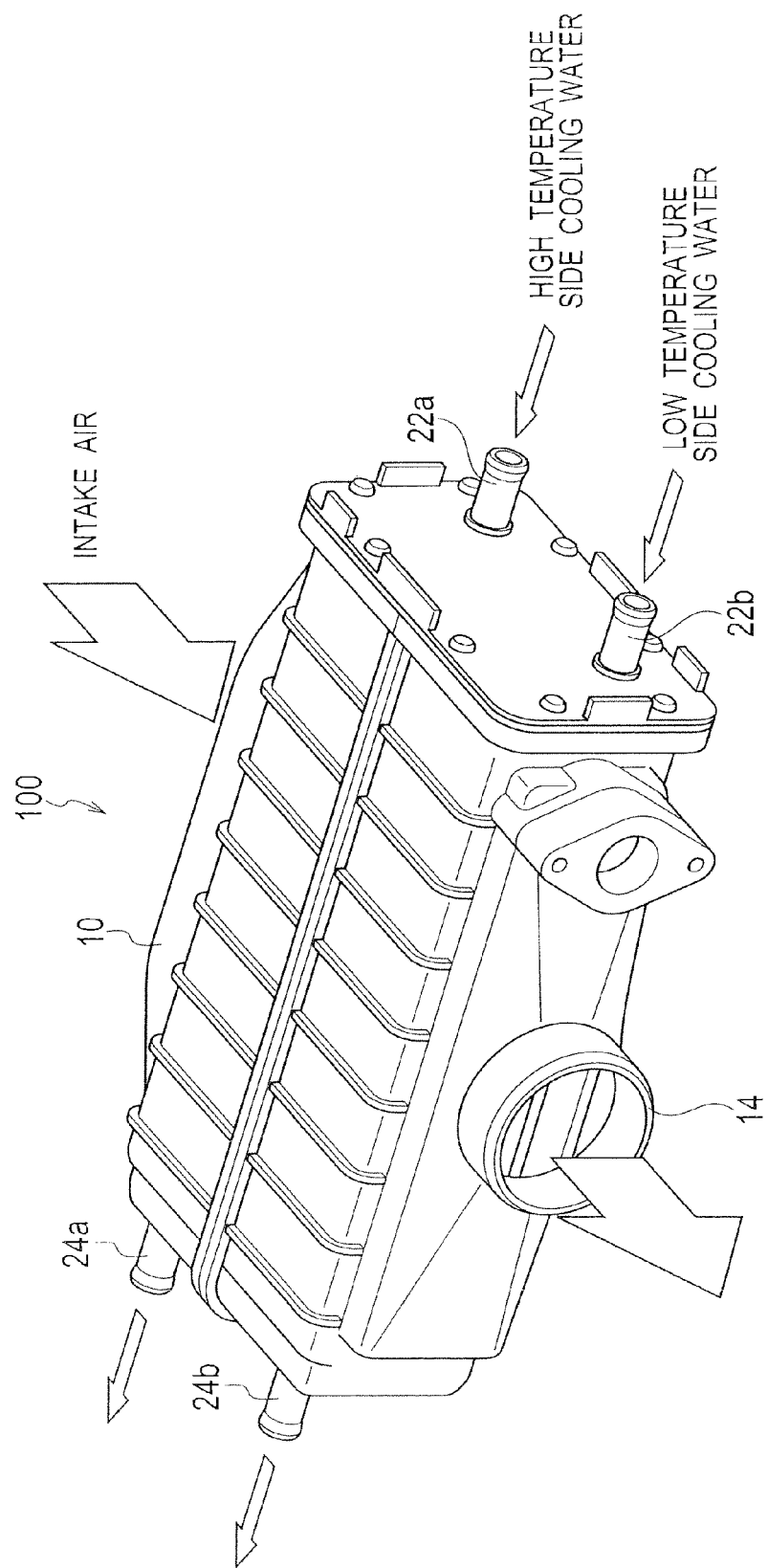
FIG. 3 is a perspective view of the charge air cooler of the first embodiment according to the present invention.

As shown in FIGS. 2 and 3, a case 10 includes an induction pipe 12 for introducing intake air compressed by a turbocharger (supercharger) 150, and an eduction pipe 14 for discharging cooled intake air. The case 10 has a flow path of supercharged intake air in its inside. The case 10 is formed of heat resistance resin. As shown in FIG. 2, the high temperature side heat exchanger 20a is disposed upstream and the low temperature side heat exchanger 20b is disposed downstream on the above-mentioned flow path within the case 10.

Figure 4:
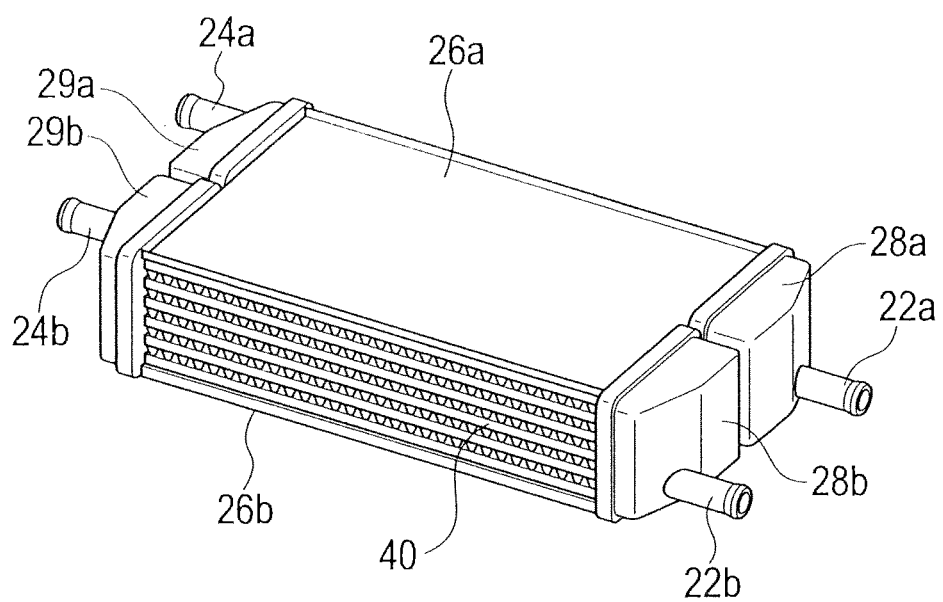
FIG. 4 is a perspective view of a heat exchanger of the charge air cooler of the first embodiment according to the present invention.

As shown in FIG. 4, the high temperature side heat exchanger 20a and the low temperature side heat exchanger 20b include a core 40, reinforcing plates 26a and 26b, inlet pipes 22a and 22b, and outlet pipes 24a and 24b. The core 40 is configured by alternately laminating flat tubes through which the first refrigerant or the second refrigerant flows and fins. The reinforcing plates 26a and 26b function as reinforcing members, and provided outside the core 40. The inlet pipes 22a and 22b are provided on inlet tanks 28a and 28b, respectively. The first refrigerant or the second refrigerant introduced from the inlet pipes 22a or 22b flows into the flat tubes. The outlet pipes 24a and 24b are provided on outlet tanks 29a and 29b, respectively. The first refrigerant or the second refrigerant flowing out form the flat tubes is discharged from the outlet pipe 24a or 24b through the outlet tank 29a or 29b.

Figure 5:
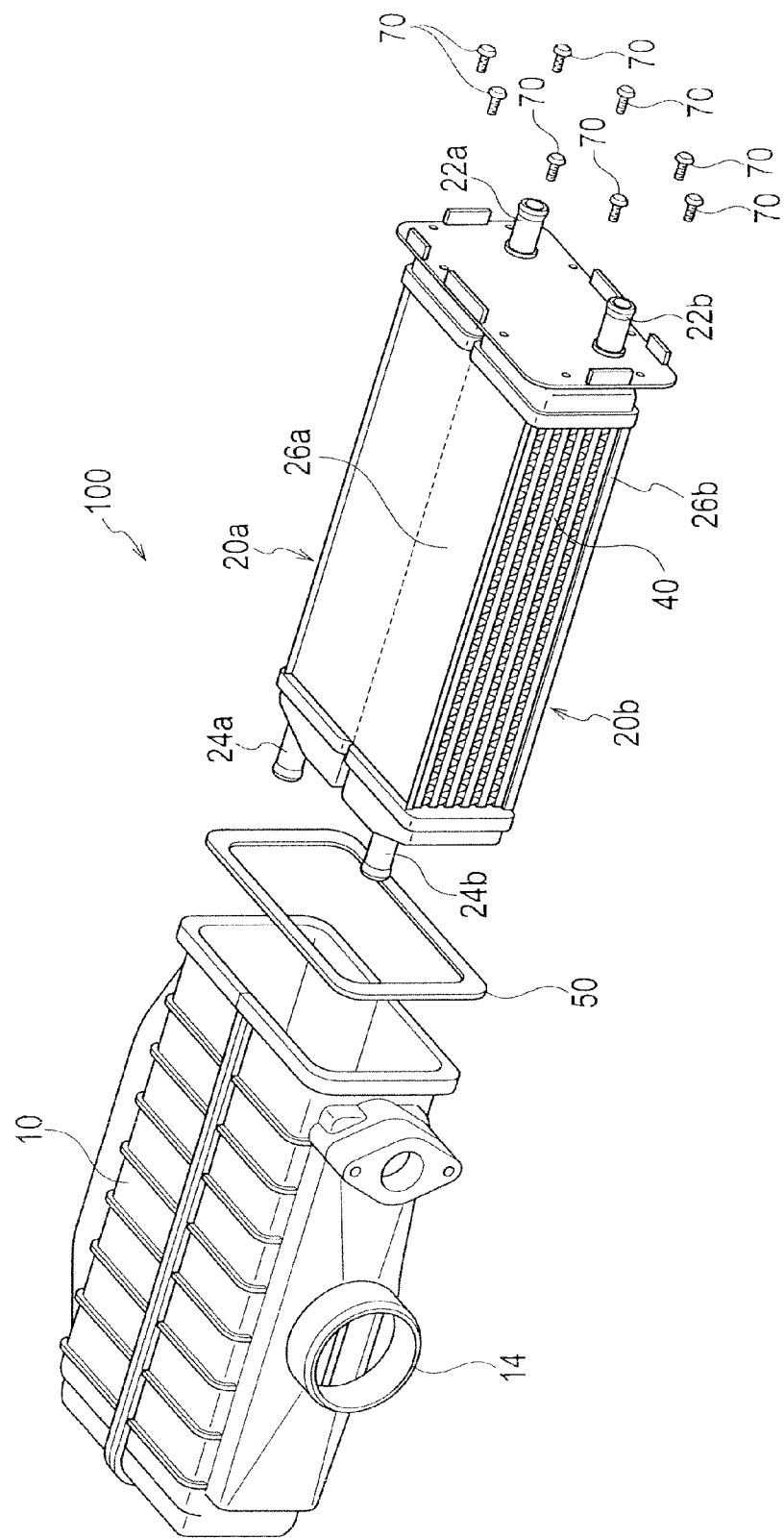
FIG. 5 is an exploded perspective view of the charge air cooler of the first embodiment according to the present invention.

Assembling process of the charge air cooler 100 will be explained. Firstly, components of the high temperature side heat exchanger 20a and the low temperature side heat exchanger 20h, such as the core 4 and so on, are temporally assembled and held by jigs. The high temperature side heat exchanger 20a and the low temperature side heat exchanger 20b are integrally brazed in such a state to be assembled. The assembled high temperature side heat exchanger 20a and the low temperature side heat exchanger 20b are inserted into the case 10 and then fixed in the inside of the case 10 by screws 70 as shown in FIG. 5. A gasket 50 is sandwiched at a joint portion between the case 10, and the high temperature side heat exchanger 20a and the low temperature side heat exchanger 20h to ensure sealing characteristics.

A cooling system for a supercharged engine using the above-described charge air cooler 100 is installed at a front in an engine compartment of a vehicle. As shown in FIG. 1, the cooling system includes the first heat exchanger 130, the second heat exchanger 110 and a third heat exchanger 120. In the first heat exchanger 130, the first refrigerant that circulates along the high temperature side cooling flow path 1 provided with an engine 140 and the high temperature side heat exchanger 20a is cooled by outside air. In the second heat exchanger 110, the second refrigerant that circulates along the low temperature side cooling flow path 2 provided with the low temperature side heat exchanger 20b is cooled by outside air. The third heat exchanger 120 functions as a condenser for air-conditioning a passenger compartment.

The high temperature side cooling flow path 1 is a flow path that goes through the first heat exchanger 130, a pump 131, a heater core 132, a thermostat 133 and the engine 140. The pump 131 gives energy to the first refrigerant to generate a flow of the first refrigerant. The heater core 132 radiates heat of the first refrigerant. The thermostat 133 switches a flow of the first refrigerant into the first heat exchanger 130 or not in order to keep temperature of the first refrigerant appropriate temperature. The engine 140 exchanges heat with the first refrigerant. The thermostat 133 is disposed at a point that locates near a discharge point of the first refrigerant from the engine 140 and also near an introductive point of the first refrigerant into the first heat exchanger 130.

On the high temperature side cooling flow path 1, when the temperature of the first refrigerant is not more than a predetermined temperature (e.g. 80° C.), the thermostat 133 raises the temperature of the first refrigerant (i.e. raises the temperature of the engine 140) by preventing the first refrigerant from flowing into the first heat exchanger 130.

On the other hand, when the temperature of the first refrigerant is not less than a predetermined temperature (e.g. 80° C.), the thermostat 133 conducts a control for keeping the temperature of the first refrigerant constant by regulating an inflow amount of the first refrigerant into the first heat exchanger 130 according to decrement from a target temperature of the first refrigerant. The high temperature side cooling flow path 1 keeps the temperature of the engine 140 constant by keeping the temperature of the first refrigerant to be supplied to the engine 140 constant.

On the high temperature side cooling flow path 1, the first refrigerant kept at the predetermined temperature passes through the pump 133, and then exchanges heat at the engine 140. Subsequently, the first refrigerant radiates heat at the heater core 132, and then flows into the inlet tank 28a of the high temperature side heat exchanger 20a from the inlet pipe 22a. The first refrigerant that has flown into the inlet tank 28a flows into each of the flat tubes (see FIG. 2 to FIG. 4). The first refrigerant that has passed through the flat tubes flows out from the outlet pipe 24a through the outlet tank 29a, and then flows to the engine 140 again. In this manner, the first refrigerant repeats cycles along the high temperature side cooling flow path 1.

On the low temperature side cooling flow path 2, the second refrigerant to be supplied to the low temperature side heat exchanger 20b is cooled by the second heat exchanger 110. At the second heat exchanger 110, the second refrigerant is cooled to a temperature (about 40° C.) enabling to cool intake air to its target temperature (about 45° C.).

On the low temperature side cooling flow path 2, the second refrigerant cooled at the second heat exchanger 110 passes through a pump 112, and then flows into the inlet tank 28b of the low temperature side heat exchanger 20b from the inlet pipe 22b. The second refrigerant that has flown into the inlet tank 28b flows into each of the flat tubes (see FIG. 2 to FIG. 4). The second refrigerant that has passed through the flat tubes flows out from the outlet pipe 24b through the outlet tank 29b, and then flows to the second heat exchanger 110 again. In this manner, the second refrigerant repeats cycles along the low temperature side cooling flow path 2.

The charge air cooler 100 is connected with the turbocharger (supercharger) 150 that compresses intake air and the engine 140. The charge air cooler 100 cools intake air that has compressed by the turbocharger 150, and then supplies the cooled intake air to the engine 140.

The intake air that has compressed by the turbocharger 150 and is raised to high temperature is introduced into the case 10 of the charge air cooler 100 from the induction pipe 12, and then passes through the core 40 of the high temperature side heat exchanger 20a (see FIG. 2 to FIG. 4). At that time, heat of the intake air is transferred to the first refrigerant via the fins and the flat tubes to reduce intake air temperature. Specifically, about 160° C. intake air is cooled to about 105° C. while passing through the high temperature side heat exchanger 20a.

Subsequently, the cooled intake air that has passed through the high temperature side heat exchanger 20a passes through the core 40 of the low temperature side heat exchanger 20b disposed adjacent to the high temperature side heat exchanger 20a (see FIG. 2 to FIG. 4). At that time, heat of the intake air is transferred to the second refrigerant via the fins and the flat tubes to reduce the intake air temperature further. Specifically, about 105° C. intake air is cooled to about 45° C. while passing through the low temperature side heat exchanger 20b. The intake air cooled at the low temperature side heat exchanger 20b is discharged from the eduction pipe 14, and then supplied to the engine 140.

Figure 6:
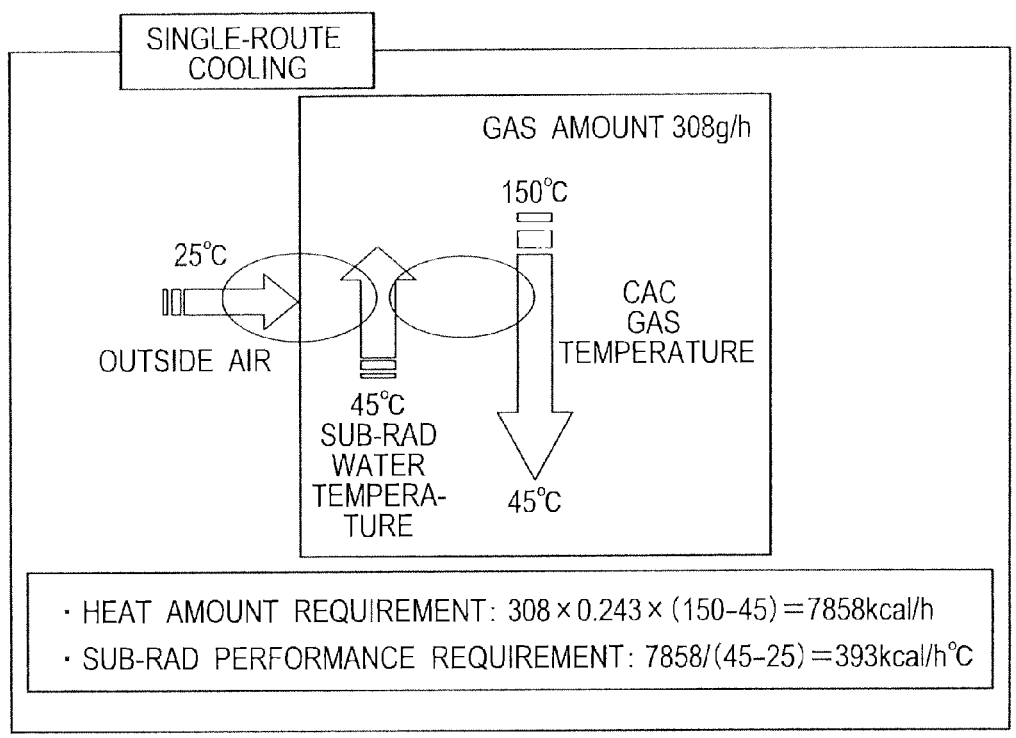
FIG. 6 is an explanatory diagram of intake air cooling with a single-route cooling system.
Figure 7:
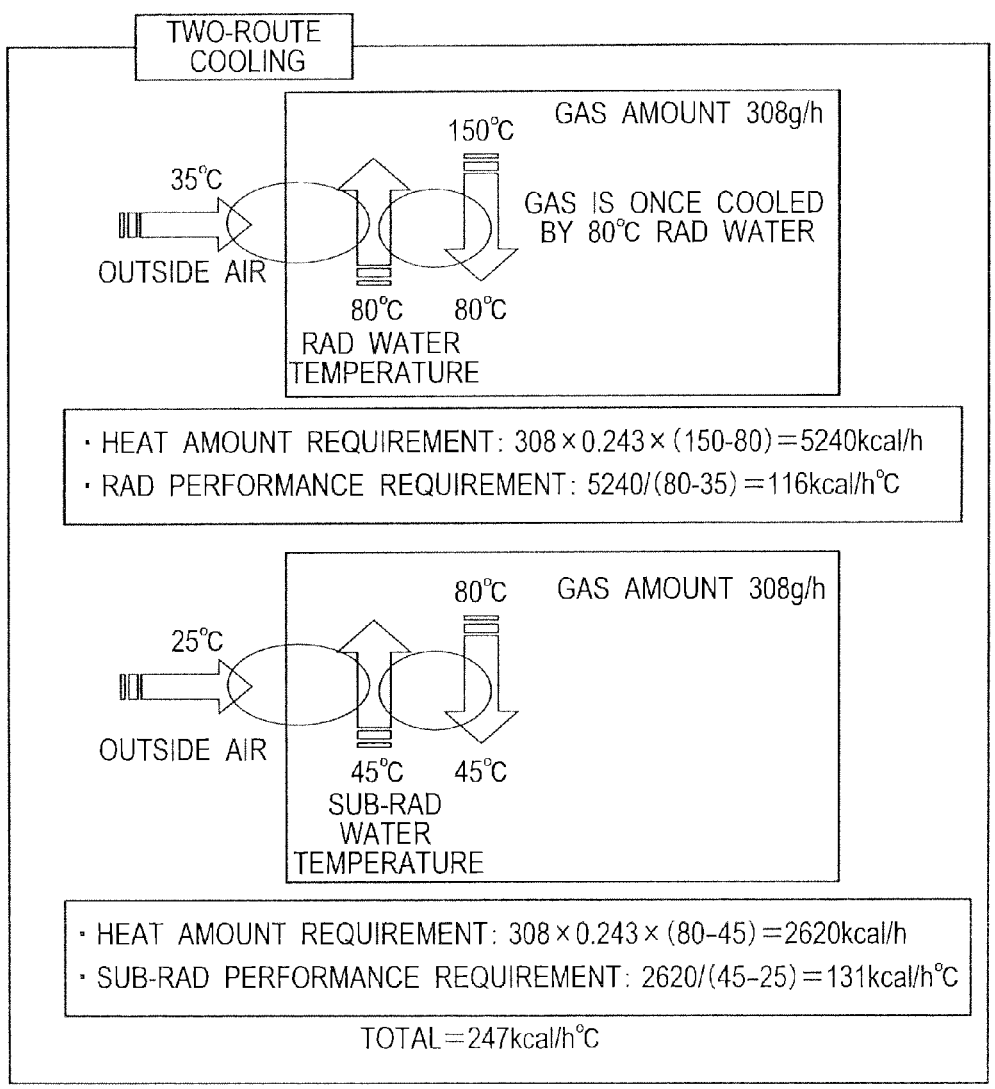
FIG. 7 is an explanatory diagram of intake air cooling with a two-route cooling system.

Hereinafter, comparative examples between a conventional single-route cooling system and the two-route cooling system of the first embodiment will be explained with reference to FIGS. 6 and 7. In the single-route cooling system, intake air is cooled by a single route with a sub-radiator (sub RAD) of a charge air cooler (CAC). In the two-route cooling system, intake air is cooled by two routes with the radiator (RAD) 130 and the sub RAD 110 in the charge air cooler 100. FIG. 6 shows heat amount (heat radiation amount) required for cooling 150° C. intake air supplied to the charge air cooler to 45° C., and performance requirement for the sub RAD. FIG. 7 shows heat amount (heat radiation amount) required for cooling 150° C. intake air supplied to the charge air cooler 100 to 45° C., and performance requirements for the RAD and the sub RAD.

In the single-route cooling system, as shown in 6, the heat amount required for cooling 150° C. intake air supplied to the charge air cooler by 308 g/h to 45° C. is 7,858 kcal/h. Note that 0.243 kcal/g° C. is specific heat of used cooling water (refrigerant). Then, with the 7,858 kcal/h heat amount, the performance requirement of the sub RAD for making outlet temperature of the cooling water of the sub RAD to 45° C. using 25° C. intake air is 393 kcal/h° C.

On the other hand, in the two-route cooling system, as shown at an upper portion in FIG. 7, the heat amount required for cooling 150° C. intake air supplied to the charge air cooler 100 by 308 g/h to 80° C. utilizing a cooling route with the RAD 130 is 5,240 kcal/h. Then, with the 5,240 kcal/h heat amount, the performance requirement of the RAD 130 for making outlet temperature of the cooling water of the RAD 130 to 80° C. using 35° C. intake air that has passed through the third heat exchanger 120 is 116 kcal/h° C.

Subsequently, as shown at a lower portion in FIG. 7, the heat amount required for cooling 80° C. intake air cooled by RAD 130 and supplied to the charge air cooler 100 by 308 g/h to 45° C. utilizing a cooling route with the sub RAD 110 is 2,620 kcal/h. Then, with the 2,620 kcal/h heat amount, the performance requirement of the sub RAD 110 for making outlet temperature of the cooling water of the sub RAD 110 to 45° C. using 25° C. intake air is 131 kcal/h° C.

Therefore, as shown in FIG. 7, total performance requirement for the RAD and sub RAD in the two-route cooling system is 116+131=247 kcal/h° C. The total performance requirement for the two-route cooling system is about 40% of the performance requirement for the single-route cooling system. Namely, total size of the sub RAD 110 and the RAD 130 in the two-route cooling system can be downsized by about 40%. Further, the first refrigerant flows within the RAD 130 with a large flow rate after returned from the charge air cooler 100 to the engine 140. Therefore, the RAD 130 has higher performance in superficial content than the sub RAD 110, so that the size can be downsized more that 40% actually.

According to the charge air cooler 100 and the cooling system in the first embodiment, firstly, the two-route cooling system is adopted in which intake air supplied to the charge air cooler is cooled by the first heat exchanger 130, and then the intake air is further cooled by the second heat exchanger 110. Therefore, intake air temperature can be cooled to its desired temperature, even if heat radiation assignation of the second heat exchanger 110 is small. Further, since the heat radiation assignation of the second heat exchanger 110 is made small, the second heat exchanger 110 can be downsized.

In addition, since the second heat exchanger 110 can be downsized, a freedom degree of its installing location on a vehicle can be enhanced. Therefore, it is not limited to a conventional installing location, i.e. a front of the first heat exchange 130, and the second heat exchanger 110 can be installed other than in front of the first heat exchange 130. If the second heat exchanger 110 is installed other than in front of the first heat exchange 130, airflow resistance increase at a front end of a vehicle can be restricted.

In addition, since the airflow resistance increase at a front end of a vehicle can be restricted, a motor fan for improving the airflow resistance may not be necessary. Therefore, power energy for the motor fan can be cut down and burdens on an in-vehicle battery can be reduced.

Figure 8:
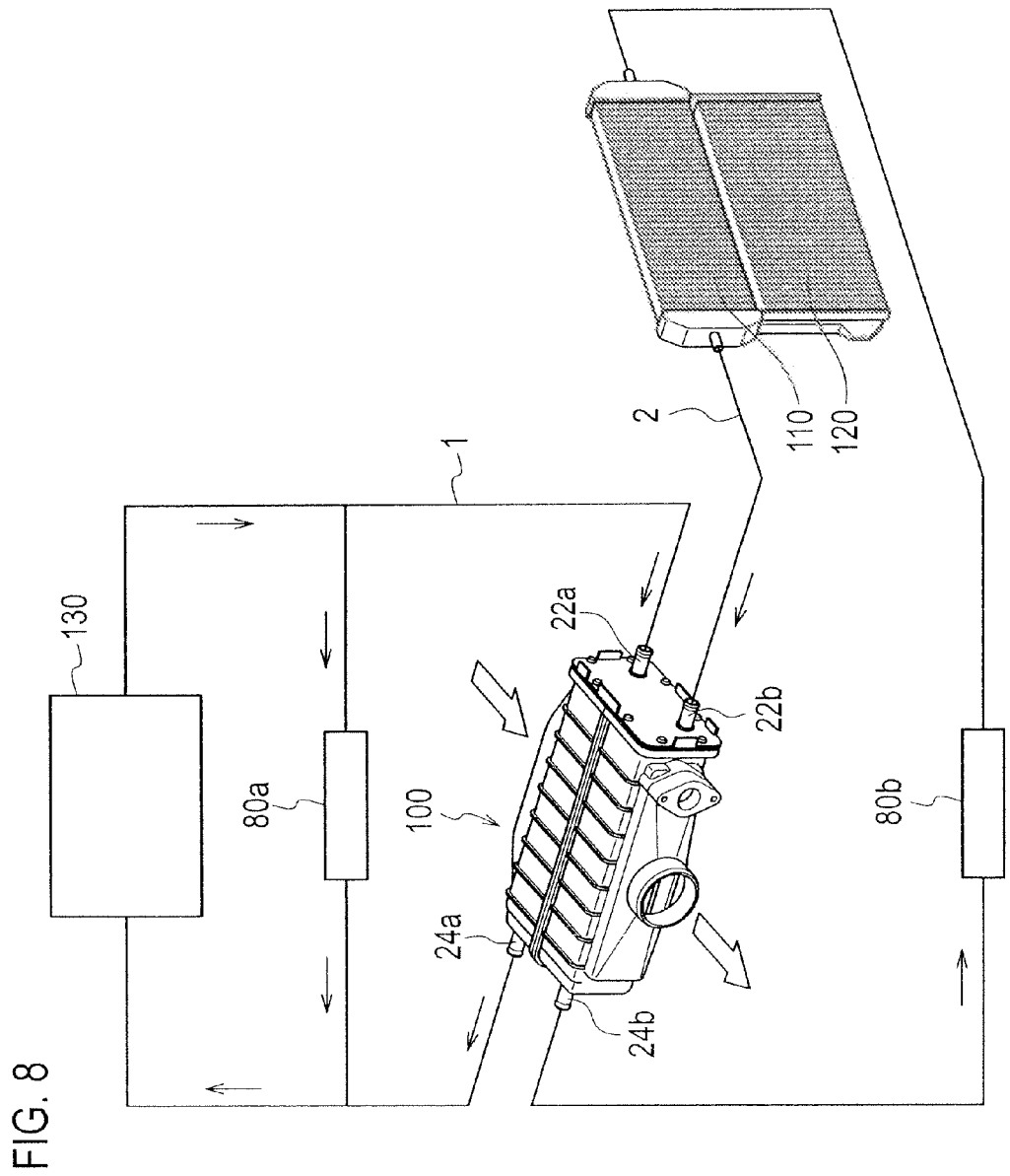
FIG. 8 is a schematic view showing arrangement of EGR coolers.

Further, in the above-described cooling system, as shown in FIG. 8, a first EGR (Exhaust Gas Recirculation) cooler 80a is provided on the high temperature side cooling flow path 1 and a second EGR cooler 80b is provided on the low temperature side cooling flow path 2. Note that the first EGR cooler 80a and the second EGR cooler 80b are not shown in FIG. 1.

EGR is extremely effective for reducing NOx emission amount in exhaust gas, and installed on many diesel vehicles. An EGR cooler cools exhaust gas recirculated by EGR. The first EGR cooler 80a and the second EGR cooler 80b have a passage for exhaust gas and a passage for cooling water, and heat is exchanged between the exhaust gas and the cooling water. Maximum combustion temperature reduces due to recirculation of cooled exhaust gas to an intake side of an engine, so that NOx emission amount is reduced.

The first EGR cooler 80a is provided on the high temperature side cooling flow path 1 in parallel with the high temperature side heat exchanger 20a. The first refrigerant for cooling the engine 140 is supplied to the first EGR cooler 80a. Therefore, temperature of the first refrigerant supplied to a refrigerant inlet port 81a of the first EGR cooler 80a is the same (e.g. 100° C.) as temperature of the first refrigerant supplied to the inlet pipe 22a of the high temperature side heat exchanger 20a.

The second EGR cooler 80b is provided on the low temperature side cooling flow path 2 in series with the low temperature side heat exchanger 20b. The second EGR cooler 80b provided downstream of the low temperature side heat exchanger 20b. The second refrigerant discharged from the low temperature side heat exchanger 20b is supplied to the second EGR cooler 80b. Therefore, temperature of the second refrigerant supplied to a refrigerant inlet port 81b of the second EGR cooler 80b is the same (e.g. 43° C.) as temperature of the second refrigerant discharged from the outlet pipe 24b of the low temperature side heat exchanger 20b. Namely, the second EGR cooler 80b cools introduced exhaust gas by the second refrigerant, and then discharge it.

The first EGR cooler 80a cools exhaust gas by the first refrigerant circulating along the high temperature side cooling flow path 1, and the second EGR cooler 80b cools the exhaust gas by the second refrigerant circulating along the low temperature side cooling flow path 2. Since recirculated exhaust gas is cooled by the two routes, each heat radiation assignation of the first EGR cooler 80a and the second NCR cooler 80b is small and and then exhaust gas temperature can be cooled to its desired temperature.

Figure 9:
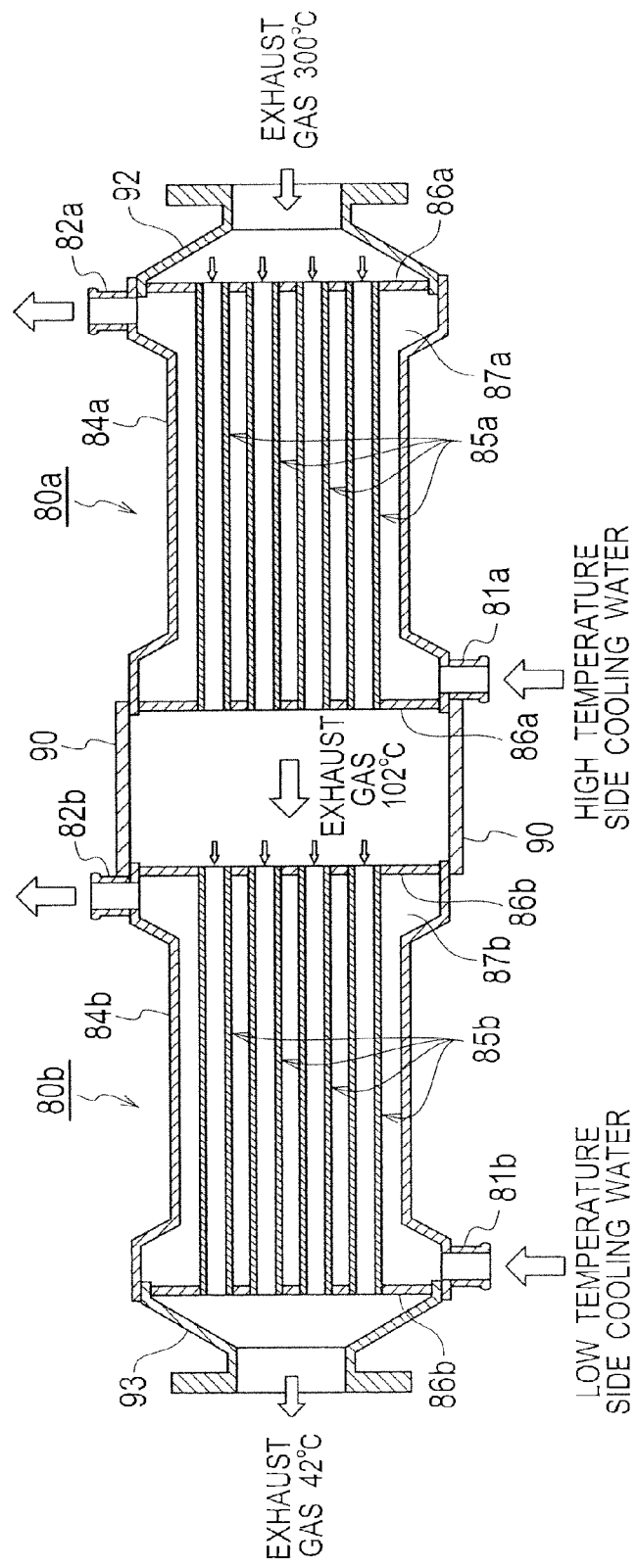
FIG. 9 is a schematic cross-sectional view showing first and second EGR coolers.

Note that, although the first EGR cooler 80a is provided on the high temperature side cooling flow path 1 and the second EGR cooler 80b is provided on the low temperature side cooling flow path 2 as mentioned above, the first NCR cooler 80a and the second EGR cooler 80b are formed integrally as shown in FIG. 9.

As shown in FIG. 9, the first EGR cooler 80a and the second EGR cooler 80b are coupled with each other at a coupling portion 90. A gas inlet port 92 as an exhaust gas inlet is disposed at an end of the first EGR cooler 80a. A gas outlet port 93 as an exhaust gas outlet is disposed at an end of the second EGR cooler 80b.

A refrigerant inlet port 81a as an inlet for the first refrigerant and a refrigerant outlet port, 82a as an outlet for the first refrigerant are provided on an outer shell case 84a of the first EGR cooler 80a. The refrigerant inlet port 81a and the refrigerant outlet port 82a may be formed integrally with the outer shell case 84a, or may be formed as separate parts and then attached on the outer shell case 84a by welding or the like. Plural exhaust pipes 85a as the passage for exhaust gas are aligned in the inside of the outer shell case 84a. Each both ends of the exhaust pipes 85a are fixed to insertion holes formed on end plates 86a by brazing, welding or the like.

The first refrigerant is introduced from the refrigerant inlet port 81a to the inside of the first EGR cooler 80a through pipings such as hoses, and then accumulated in a refrigerant accumulating section 87a formed around the exhaust pipes 85a. The first refrigerant forms swirl flows in the refrigerant accumulating section 87a and flows around the exhaust pipes 85a. The first refrigerant flows from various directions in the refrigerant accumulating section 87a, so that backwater and stagnation never occurs even if many of the exhaust pipes 85a are arranged. The first refrigerant that has cooled the exhaust gas is discharged from the piping connected with the refrigerant outlet port 82a.

A refrigerant inlet port 81b as an inlet for the second refrigerant and a refrigerant outlet port 82b as an outlet for the second refrigerant are provided on an outer shell case 84b of the second EGR cooler 80b. The refrigerant inlet port 81b and the refrigerant outlet port 82b may be formed integrally with the outer shell case 84b, or may be formed as separate parts and then attached on the outer shell case 84b by welding or the like. Plural exhaust pipes 85b as the passage for exhaust gas are aligned in the inside of the outer shell case 84b. Each both ends of the exhaust pipes 85b are fixed to insertion holes formed on end plates 86b by brazing, welding or the like.

The second refrigerant is introduced from the refrigerant inlet port 81b to the inside of the second EGR cooler 80b through pipings such as hoses, and then accumulated in a refrigerant accumulating section 87b formed around the exhaust pipes 85b. The second refrigerant forms swirl flows in the refrigerant accumulating section 87b and flows around the exhaust pipes 85b. The second refrigerant flows from various directions in the refrigerant accumulating section 87b, so that backwater and stagnation never occurs even if many of the exhaust pipes 85b are arranged. The second refrigerant that has cooled the exhaust gas is discharged from the piping connected with the refrigerant outlet port 82b.

Hereinafter, an example of a cooling process by the first EGR cooler 80a and the second EGR cooler 80b shown in FIG. 9 will be explained.

About 300° C. high-temperature exhaust gas flowing-in from the gas inlet port 92 is cooled while passing through the plural exhaust pipes 85a and then reaches to the coupling portion 90. Since about 100° C. first refrigerant flows around the exhaust pipes 85*a* oppositely to a flow direction of the exhaust gas, the high-temperature exhaust gas is gradually cooled while flowing through the exhaust pipes 85*a*. The exhaust gas that has reached to the coupling portion 90 is cooled to about 102° C.

The exhaust gas that has reached to the coupling portion 90 is cooled while passing through the plural exhaust pipes 85*b* and then reaches to the gas outlet port 93. Since about 40° C. second refrigerant flows around the exhaust pipes 85*b* oppositely to a flow direction of the exhaust gas, the exhaust gas discharged from the first EGR cooler 80*a* is gradually cooled while flowing through the exhaust pipes 85*b*. The exhaust gas that has reached to the gas outlet port 93 is cooled to about 42° C.

The exhaust gas cooled in the first EGR cooler 80*a* and the second EGR cooler 80*b* is discharged from the gas outlet port 93 and then recirculated to an intake passage of the engine via an EGR valve (not shown) that regulates a flow rate.

Note that the high temperature side cooling flow path 1 (first refrigerant flow path) shown in the cooling system of the above-described embodiment only exemplifies one arrangement of components on a route. The high temperature side cooling flow path 1 can be modified to another routing embodiment with another arrangement. On the high temperature side cooling flow path 1 in the above-described embodiment, as shown in FIG. 1, the first refrigerant cooled in the first heat exchanger 130 exchanges heat at the engine 140, radiates heat at the heater core 132, and then is supplied to the high temperature side heat exchanger 20*a*.

Figure 10:
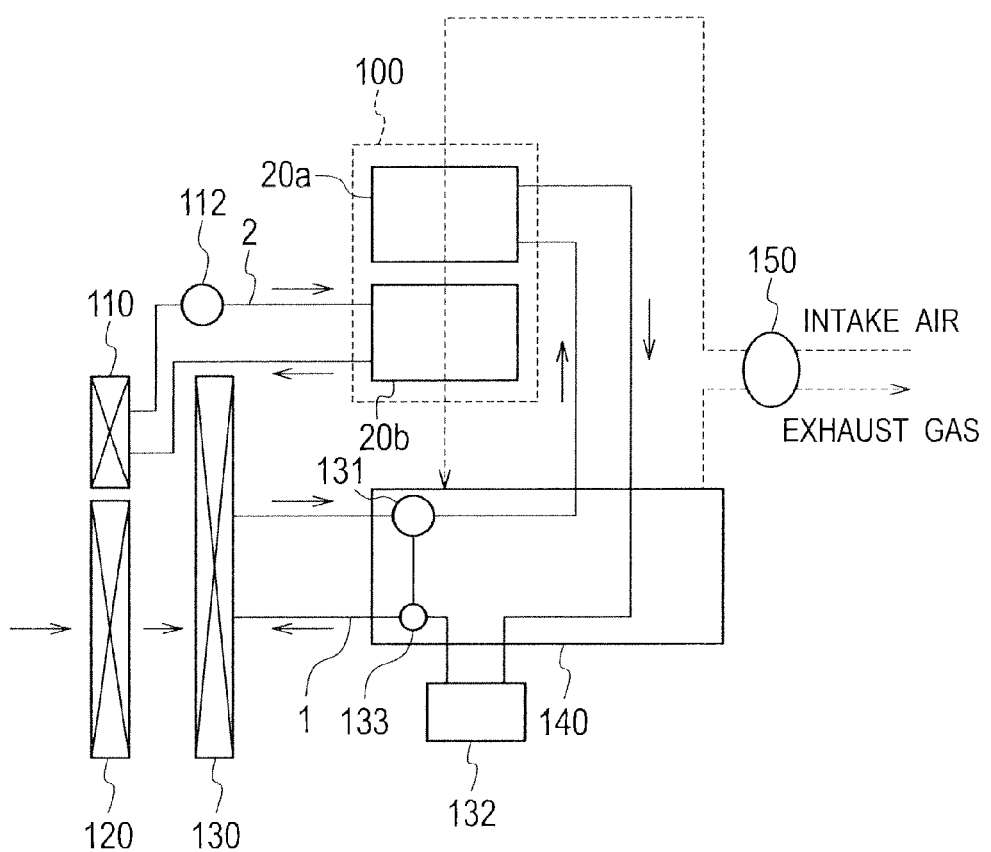
FIG. 10 is a block diagram showing a cooling system using a charge air cooler of a modified example according to the present invention.

On the other hand, a modified example of the cooling system (the high temperature side cooling flow path 1) is shown in FIG. 10. As shown in FIG. 10, on the high temperature side cooling flow path 1, the first refrigerant cooled in the first heat exchanger 130 is supplied to the high temperature side heat exchanger 20*a*, exchanges heat at the engine 140, and then radiates heat at the heater core 132. By this modified example, advantages similar to advantages achieved by the cooling system in the above-described embodiment can be achieved. In addition, temperature of the engine 140 can be raised easily when the temperature of the engine 140 is low by this modified example. Further, lower-temperature first refrigerant can be supplied to the high temperature side heat exchanger 20*a* by this modified example than by the cooling system in the above-described embodiment.

Figure 11:
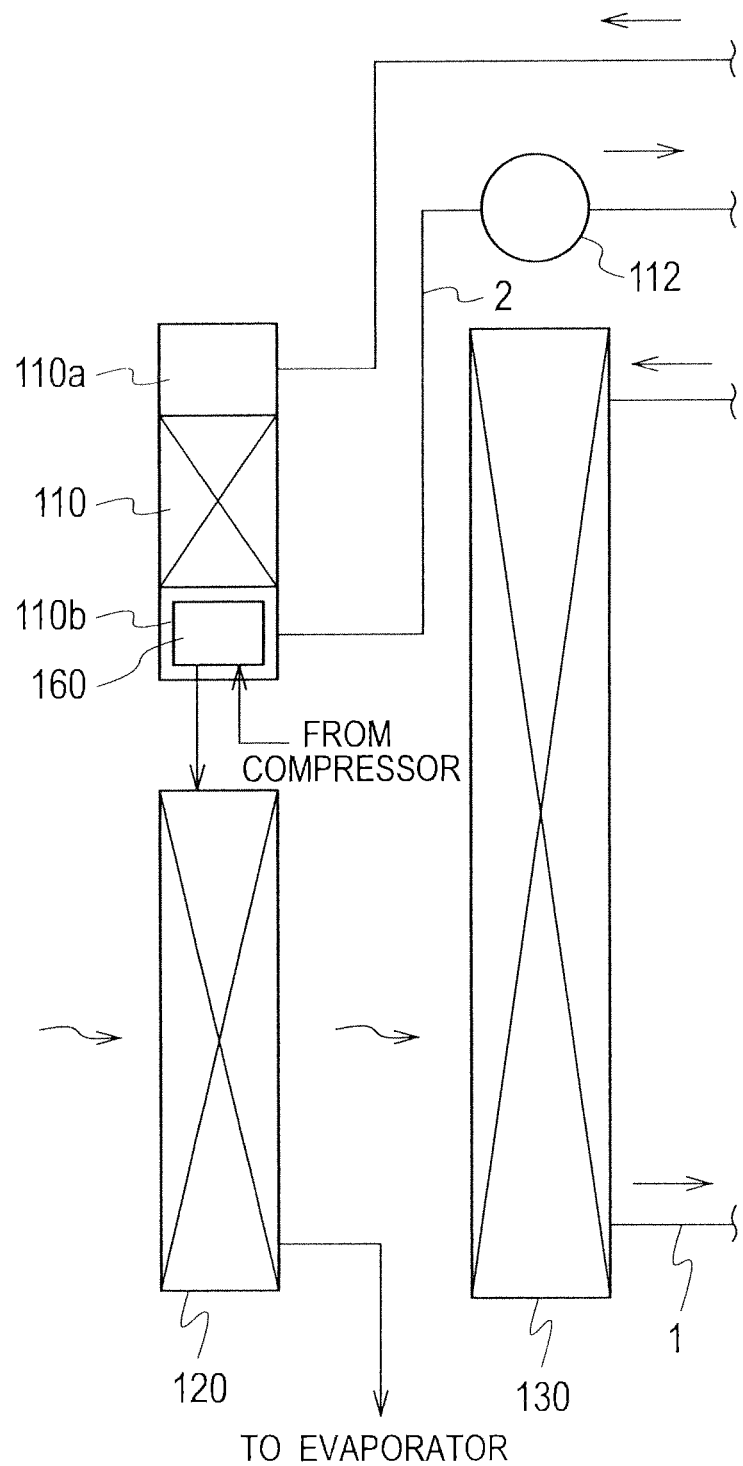
FIG. 11 is a partial block diagram showing a charge air cooler of a modified example according to the present invention.

In addition, as shown in FIG. 11, a condenser 160 for cooling air-conditioning refrigerant may be provided in an outlet tank 110*b* of the second heat exchanger (sub-radiator) 110 in the charge air cooler 100 of the above-described embodiment. According to this, the air-conditioning refrigerant flowing within the condenser 160 is cooled by the second refrigerant. By cooling the air-conditioning refrigerant flowing within the condenser 160 is cooled by the second refrigerant, the third heat exchanger (condenser) 120 can be supported while idling and so on. As a result, air-conditioning efficiency is improved, so that the third heat exchanger 120 can be downsized. As shown in the above-described embodiment, since the third heat exchanger 120 can be downsized in addition to the downsizing of the second heat exchanger 110 by the two-route cooling system, the second heat exchanger 110 can be further easily installed other than in front of the first heat exchanger 130. As a result, airflow resistance increase at a front end of a vehicle can be further restricted. Note that, although the condenser 160 is provided in the outlet tank 110*b* of the second heat exchanger (sub-radiator) 120, it may be provided in its inlet tank 110*a*.

Note that, in the above-described embodiment, the first refrigerant cooled at the first heat exchanger 130 and the second refrigerant cooled at the second heat exchanger 110 can cool another heat generating element(s) if their temperature would not be raised relatively high.

Next, an intake air control system will be explained. In an internal combustion engine, fuel consumption may be lowered by 20% to 30% due to fluctuation of intake air temperature. Therefore, is required to keep intake air temperature constant at its appropriate temperature in order to improve fuel consumption.

Since intake air temperature rises when the intake air is compressed by a supercharger or when outside air temperature is high such as during summer season, the intake air must be cooled to keep its appropriate intake air temperature. On the other hand, since intake air temperature is low during a steady operation or when outside air is low such as winter season, the intake air must be heated to keep its appropriate intake air temperature.

Therefore, a supply air temperature controlling method for keep appropriate intake air temperature is proposed (e.g. Japanese patent Application laid-Open No. 2003-262131 [Patent Document 3]). In this controlling method, temperature of intake air in an intake air passage and temperature of refrigerant (cooling water) flowing through a charge air cooler are detected. By adjusting an amount if the refrigerant flowing through the charge air cooler based on a detected value of the intake air, the temperature of the intake air is kept at a predetermined temperature. In addition, by adjusting an amount of the refrigerant flowing through a cooling apparatus that cools the refrigerant of the charge air cooler, the temperature of the refrigerant is controlled to a predetermined temperature.

However, in a case of keeping appropriate intake air temperature by controlling refrigerant temperature, the refrigerant temperature must be firstly controlled to the predetermined temperature, so that responsiveness is bad. An object of an intake air control system described hereinafter is to control intake air temperature at its desired temperature with high responsiveness.

However, configuration elements similar-to or same-as those in the above-described embodiment are numbered with identical numerals, and their detailed explanations are omitted. The intake air control system according to the present embodiment includes the high temperature side heat exchanger 20*a*, the low temperature side heat exchanger 20*b*, a bypass pathway 44, and a thermostatic regulating valve 32. At the high temperature side heat exchanger 20*a*, heat is exchanged between the first refrigerant that has exchanged heat by the first heat exchanger (radiator) 130, and the intake air. The low temperature side heat exchanger 20*b* is disposed downstream of the high temperature side heat exchanger 20*a* on an intake air flow passage. At the low temperature side heat exchanger 20*b*, heat is exchanged between the second refrigerant that has exchanged heat by the second heat exchanger (sub-radiator) 120 so as to have lower temperature than the first refrigerant, and the intake air that has exchanged heat at the high temperature side heat exchanger 20*a*. The bypass pathway 44 is disposed downstream of the high temperature side heat exchanger 20*a* and in parallel with the low temperature side heat exchanger 20*b*. The intake air that has exchanged heat at the high temperature side heat exchanger 20*a* flows through the bypass pathway 44 to bypass the low temperature side heat exchanger 20*b*. The thermostatic regulating valve 32 controls temperature of the intake air to be supplied to the engine 140 by regulating a flow rate of the intake air that has exchanged heat at the low temperature side heat exchanger 20b and a flow rate of the intake air that has flown through the bypass pathway 44. Note that the high temperature side heat exchanger 20a, the low temperature side heat exchanger 20b and the thermostatic regulating valve 32 are housed within a case 10 of a charge air cooler 100X (second embodiment) that will be explained later.

The intake air control system further includes turbocharger (supercharger) 150 and a switching valve 30. The turbocharger 150 compresses intake air to supply it. The switching valve 30 is disposed upstream of the high temperature side heat exchanger 20a on the intake air flow passage. The switching valve 30 supplies any one of compressed intake air that was compressed by the turbocharger 150 and natural intake air that did not flow through the turbocharger 150 to the high temperature side heat exchanger 20a. Note that a turbo bypass path 42 is provided as a flow passage of the natural intake air that did not flow through the turbocharger 150 with controlled by the switching valve 30.

Figure 12:
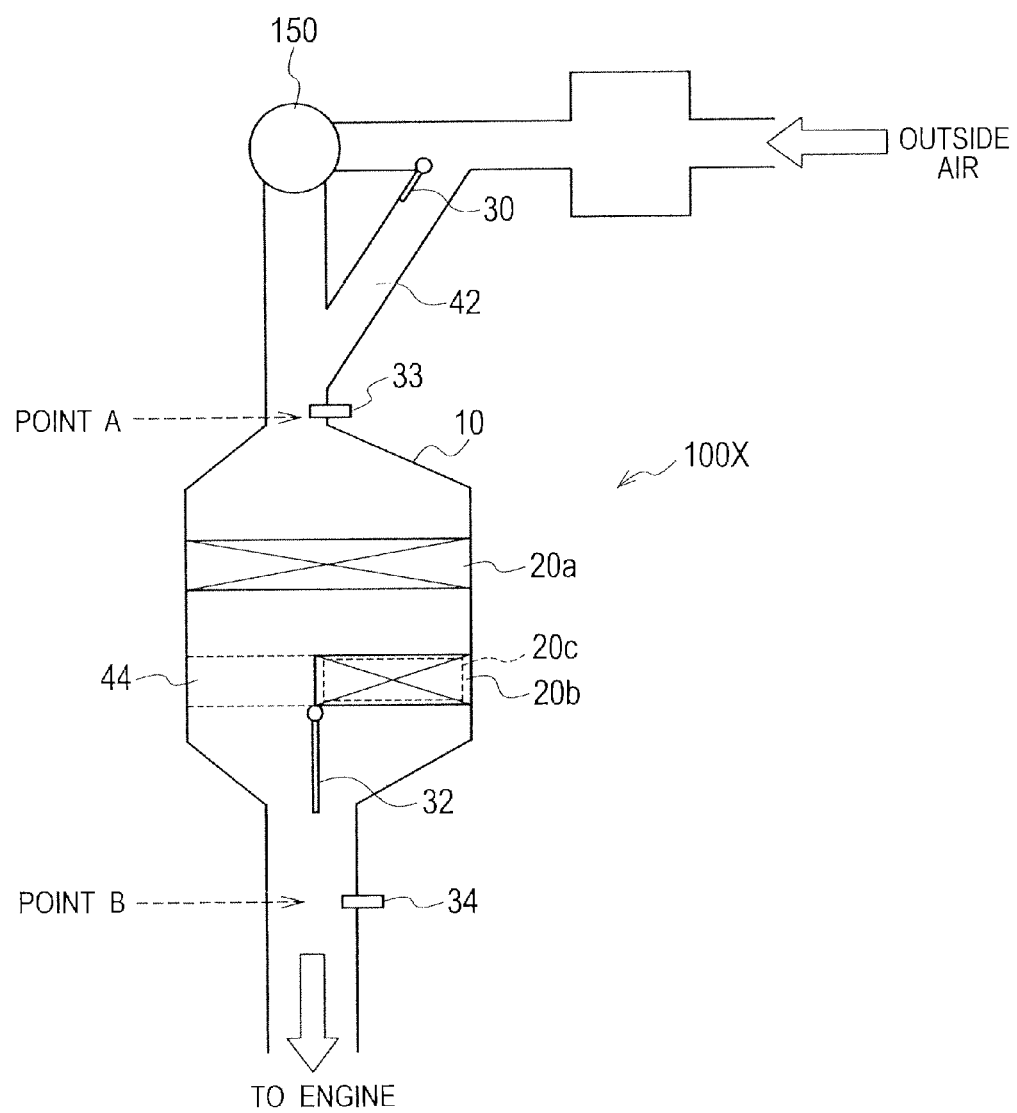
FIG. 12 is a schematic diagram showing an intake air control system of an embodiment according to the present invention.
Figure 13:
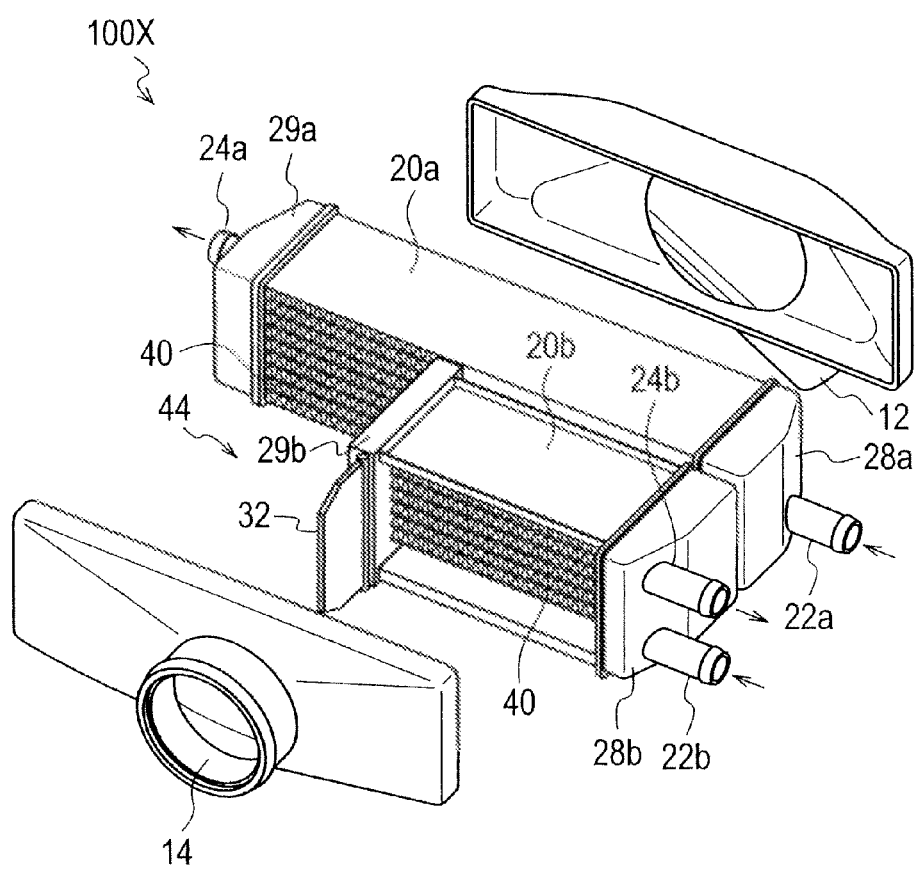
FIG. 13 is an exploded perspective view showing a charge air cooler used in the intake air control system of the embodiment according to the present invention (a charge air cooler of a second embodiment according to the present invention).

The high temperature side heat exchanger 20a, the low temperature side heat exchanger 20b and the switching valve 30 are housed in the case 10 as shown in FIG. 12. As shown in FIG. 13, the case 10 includes an induction pipe 12 for introducing the compressed intake air that was compressed by the turbocharger 150 or the natural intake air that did not flow through the turbocharger 150, and an eduction pipe 14 for discharging cooled intake air. The case 10 has a flow path of the intake air in its inside. The case 10 is formed of heat resistance resin.

As shown in FIG. 13, the high temperature side heat exchanger 20a and the low temperature side heat exchanger 20b include cores 40, inlet pipes 22a and 22b, and outlet pipes 24a and 24b. The cores 40 are configured by alternately laminating flat tubes through which the first refrigerant or the second refrigerant flows and fins. The inlet pipe 22a is provided on an inlet tanks 28a. The first refrigerant introduced from the inlet pipe 22a flows into the flat tubes. The outlet pipe 24a is provided on an outlet tank 29a. The first refrigerant flowing out form the flat tubes is discharged from the outlet pipe 24a through the outlet tank 29a. The inlet pipe 22b and the outlet pipe 24b are provided on an inlet/outlet tank 28b. The second refrigerant introduced from the inlet pipe 22b flows into some of the flat tubes, and reaches to a turnover tank 29b on another end. The second refrigerant that has reached to the turnover tank 29b flows into others of the flat tubes, and flows out to the inlet/outlet tank 28b to be discharged from the outlet pipe 24b.

The first refrigerant flows into the inlet tank 28a from the inlet pipe 22a, and further flows into the flat tubes. The first refrigerant passes through the outlet tank 28b after passing through the flat tubes, and then flows out from the outlet pipe 24a. The first refrigerant is cooling water that is cooled at the radiator (first heat exchanger) 130 for an engine cooling system.

The second refrigerant flows into the inlet/outlet tank 28b from the inlet pipe 22b, and further flows into some of the flat tubes. The second refrigerant turns over in the turnover tank 29b after passing through the flat tubes, and flows into the inlet/outlet tank 28b through others of the flat tubes to flow out from the outlet pipe 24b. The second refrigerant is cooling water that is cooled at the sub-radiator (second heat exchanger) 110 for a refrigerant recirculation system independent from the engine cooling system.

As shown in FIG. 14(a) and FIG. 14(b), the thermostatic regulating valve 32 regulates a flow rate of the intake air that has exchanged heat at the low temperature side heat exchanger 20b and a flow rate of the intake air that has flown through the bypass pathway 44 so as to achieve intake air target temperature for optimal fuel consumption.

Figure 15:
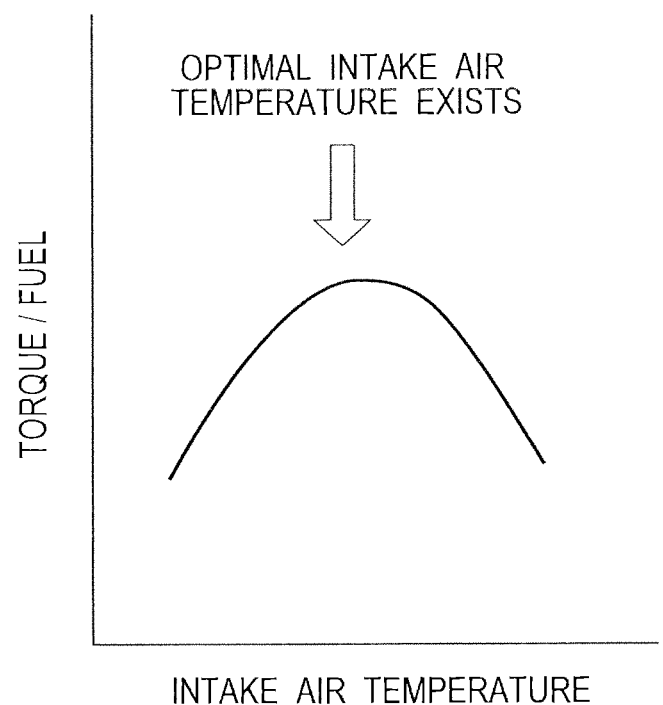
FIG. 15 is a graph showing relationship between intake air temperature and (axial torque/fuel).

An example of a method for calculating the intake air target temperature for optimal fuel consumption will be explained with reference to a graph shown in FIG. 15. The graph shown in FIG. 15 shows relationship between intake air temperature and axial torque (engine torque) to fuel consumption. The relationship between intake air temperature and axial torque (engine torque) to fuel consumption is obtained from relationship between intake air temperature and fuel consumption (fuel consumption rate), and relationship between intake air temperature and axial torque. Namely, it shows changes of axial torque per fuel consumption along with changes of intake air temperature. Since a peak of a curved line in the graph indicates a time when axial torque and fuel consumption become optimal, intake air at the time is calculated as intake air target temperature during a steady operation.

Figure 16:
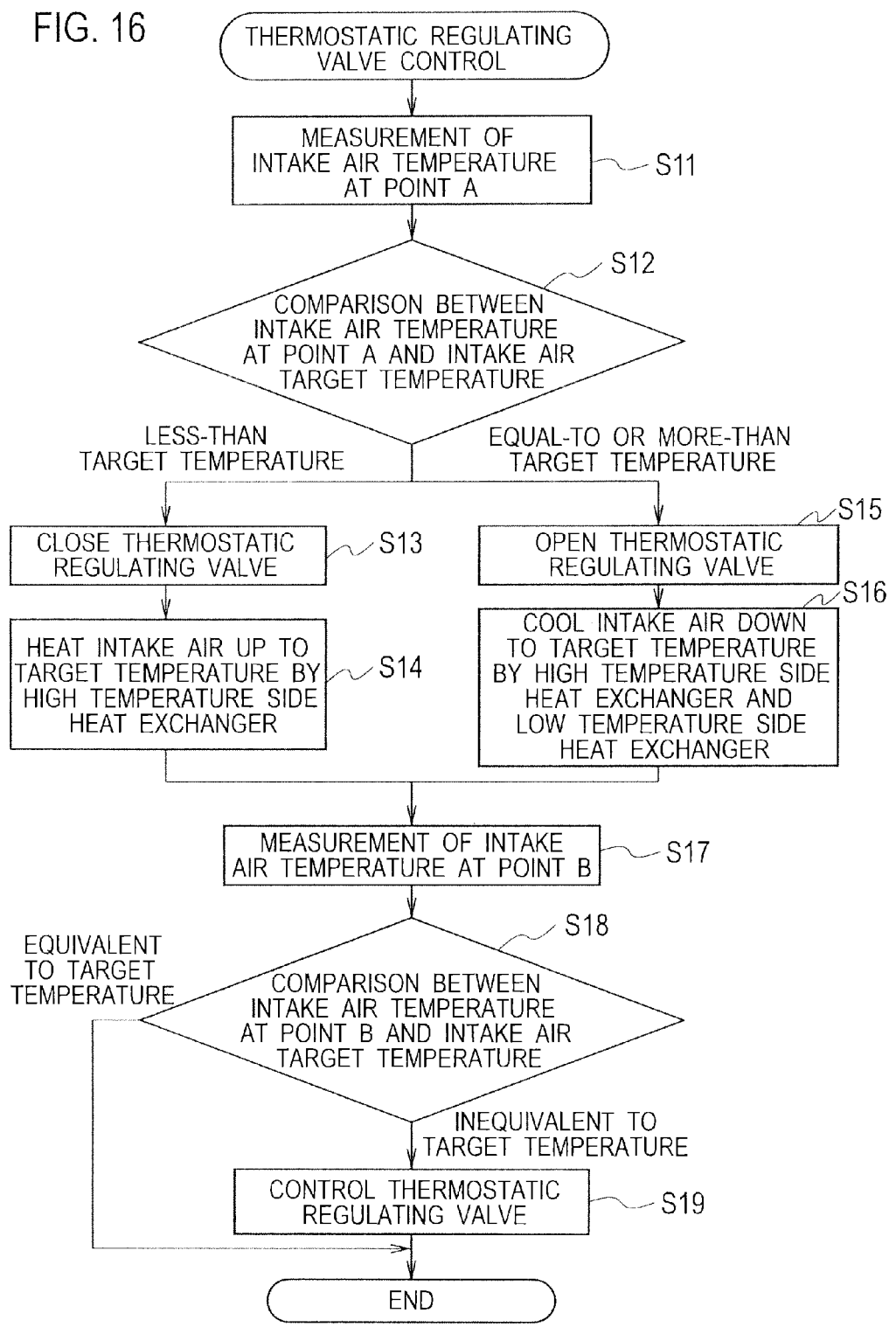
FIG. 16 is a flowchart of a control of the thermostatic regulating valve.

Control of the thermostatic regulating valve 32 will be explained with reference to a flowchart shown in FIG. 16.

Firstly, temperature of intake air to be supplied to the high temperature side heat exchanger 20a (intake air temperature at point A) is measured by a sensor 33 disposed upstream of the high temperature side heat exchanger 20a on the intake air flow passage (step S11).

Next, the intake air temperature at point A and the intake air target temperature are compared (step S12). Here, the intake air target temperature is temperature calculated from the above-described graph shown in FIG. 14 during a steady operation, but is lowest possible temperature during accelerating. When the intake air temperature at point A is less than the intake air target temperature as the comparison result between the intake air temperature at point A and the intake air target temperature, the process flow proceeds to step S13. On the other hand, when the intake air temperature at point A is equal-to or more-than the intake air target temperature, the process flow proceeds to step S15. For example, in a case where the intake air target temperature is 40° C., it proceeds to step S13 when the intake air temperature at point A is −20° C., and it proceeds to step S15 when the intake air temperature at point A is 150° C.

In a case where it proceeds to step S13, the thermostatic regulating valve 32 is closed (FIG. 14 (b)). When the thermostatic regulating valve 32 is closed, the intake air passing through the low temperature side heat exchanger 20b is blocked, and only the intake air flowing through the bypass pathway 44 is supplied to the engine 140. After controlling the thermostatic regulating valve 32, the intake air is heated to the target temperature by the high temperature side heat exchanger 20a (step S14). For example, when the intake air temperature is at point A is −20° C., the intake air is heated to the target temperature 40° C. due to heat exchange with about 90° C. first refrigerant of the high temperature side heat exchanger 20a.

On the other hand, in a case where it proceeds to step S15, the thermostatic regulating valve 32 is opened (FIG. 14 (a)). When the thermostatic regulating valve 32 is opened, the intake air passing through the low temperature side heat exchanger 20b is not blocked but supplied to the engine 140 (the bypass pathway 44 is blocked). After controlling the thermostatic regulating valve 32, the intake air is cooled to the target temperature by the high temperature side heat exchanger 20a and the low temperature side heat exchanger 20b (step S16). For example, when the intake air temperature is at point A is 150° C., the intake air is cooled to about 90° C. due to heat exchange with about 90° C. first refrigerant of the high temperature side heat exchanger 20a. Further, the intake air is cooled to the target temperature 40° C. due to heat exchange with about 40° C. second refrigerant of the low temperature side heat exchanger 20b.

After step S14 or step S16, temperature of the intake air to be supplied to the engine 140 (intake air temperature at point B) is measured by a sensor 34 disposed upstream of the engine 140 on the intake air flow passage (step S17).

Next, the intake air temperature at point B and the intake air target temperature are compared (step S18). When the intake air temperature at point B is equivalent to the intake air target temperature as the comparison result between the intake air temperature at point B and the intake air target temperature, the control of the thermostatic regulating valve 32 is terminated. On the other hand, when the intake air temperature at point B is inequivalent to the intake air target temperature, the thermostatic regulating valve 32 is controlled (step S19). In the control of the thermostatic regulating valve 32 in step S19, the thermostatic regulating valve 32 is controlled so as to regulate the temperature of the intake air be supplied to the engine 140 to the target temperature by regulating a flow rate of the intake air that has exchanged heat at the low temperature side heat exchanger 20b and a flow rate of the intake air that has flown through the bypass pathway 44.

As shown in FIG. 17(a) and FIG. 17(b), the switching valve 30 supplies any one of the compressed intake air that was compressed by the turbocharger 150 and the natural intake air that did not flow through the turbocharger 150 to the high temperature side heat exchanger 20a. Namely, it is a valve for switching intake air to be supplied to any one of the compressed intake air and the natural intake air.

Figure 18:
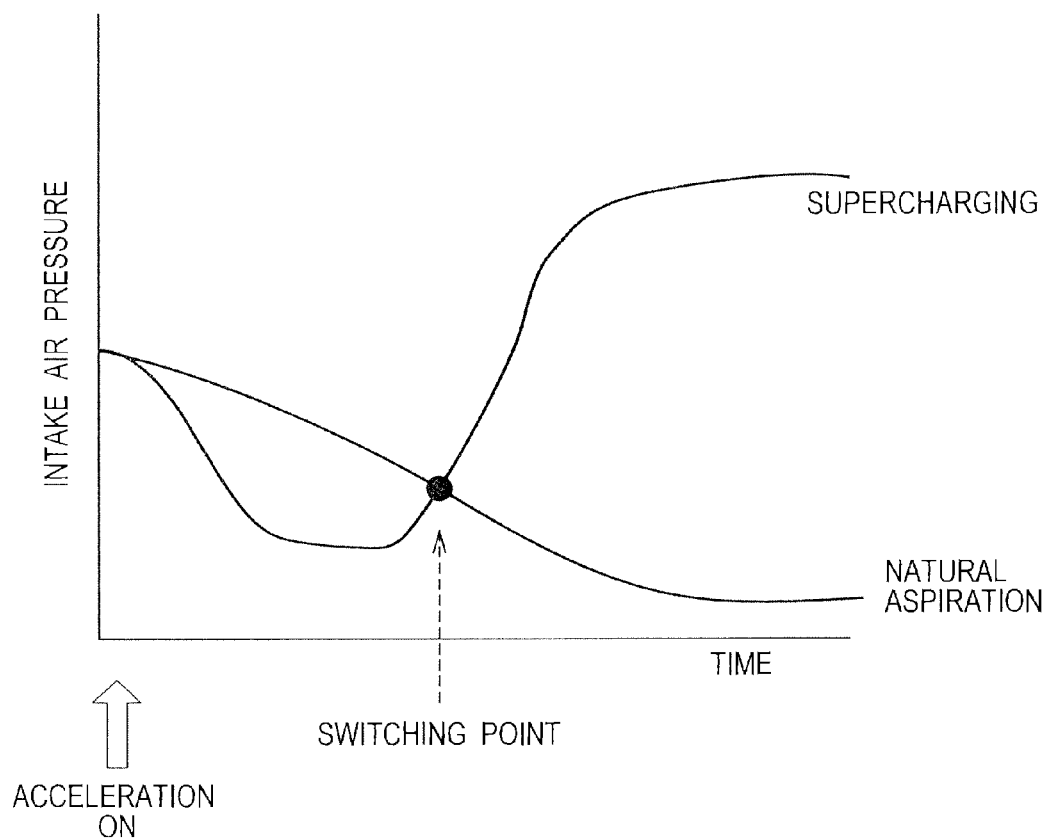
FIG. 18 is a graph showing a switching point of the switching valve.

A switching point between the compressed intake air and the natural intake air will be explained with reference to a graph shown in FIG. 18. As shown in FIG. 18, there is a phenomenon in which intake air pressure of the compressed intake air becomes lower than intake air pressure of the natural intake just after an accelerator pedal is depressed. This phenomenon occurs at an acceleration initial stage of the engine 140 supercharged by the turbocharger 150, while a turbine of the turbocharger 150 does not rotate sufficiently, or while the intake air takes on negative pressure. Then, if the accelerator pedal is kept depressed, the intake air pressure of the compressed intake air becomes higher than the intake air pressure of the natural intake air. A switching point between the intake air pressure of the compressed intake air and the intake air pressure of the natural intake air is set as the switching point between the compressed intake air and the natural intake air.

Figure 19:
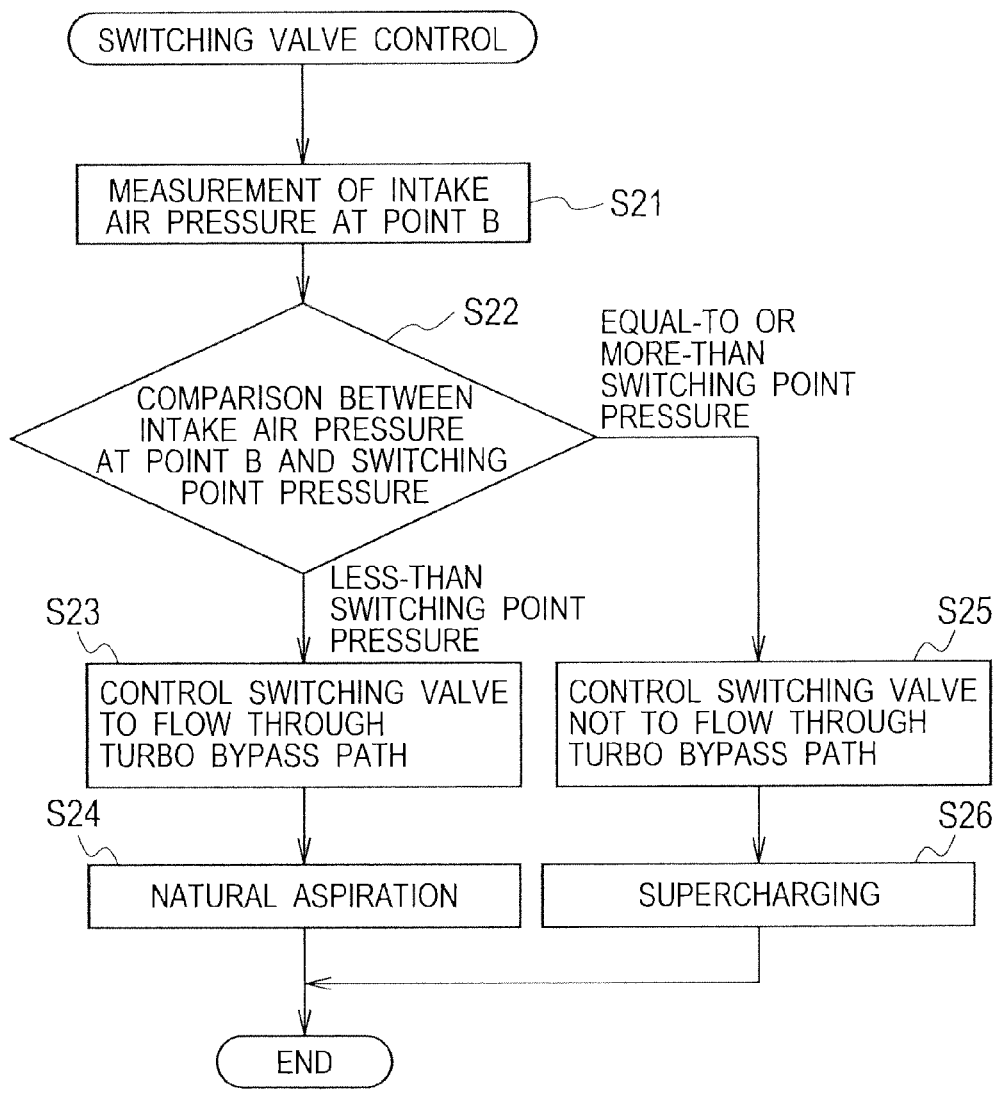
FIG. 19 is a flowchart of a control of the switching valve.

Control of the switching valve 30 will be explained with reference to a flowchart shown in FIG. 19.

Firstly, pressure of the intake air to be supplied to the engine 140 (intake air pressure at point B) is measured by the sensor 34 disposed upstream of the engine 140 on the intake air flow passage (step S21).

Next, the intake air pressure at point B and the switching point pressure are compared (step S22). When the intake air pressure at point B is less than the switching point pressure as the comparison result between the intake air pressure at point B and the switching point pressure, the process flow proceeds to step S23. On the other hand, when the intake air pressure at point B is equal-to or more-than the switching point pressure, the process flow proceeds to step S25.

In a case where it proceeds to step S23, the switching valve 30 is opened (FIG. 17(b)). After opening the switching valve 30, the natural intake air is supplied to the engine 140 through the turbo bypass path 42 (step S24). And then, the control of the switching valve 30 with the natural intake air is terminated.

On the other hand, in a case where it proceeds to step S25, the switching valve 30 is closed (FIG. 17(b)). After closing the switching valve 30, the compressed intake air is supplied to the engine 140 by the turbocharger 150 (step S26). And then, the control of the switching valve 30 with the compressed intake air is terminated.

According to the intake air control system in the present embodiment, the natural intake air is supplied with the switching valve 30 opened during a period before the switching point at acceleration. At this time, since the thermostatic regulating valve 32 is opened to cool the intake air at the high temperature side heat exchanger 20a and the low temperature side heat exchanger 20b, a response at an acceleration initial stage can be improved.

On the other hand, since the compressed intake air is supplied with the switching valve 30 closed during a period after the switching point, charging efficiency of intake air in the engine 140 is improved.

Further, since the flow rate of the intake air that has exchanged heat at the low temperature side heat exchanger 20b and the flow rate of the intake air that has flown through the bypass pathway 44 is regulated by the control of the thermostatic regulating valve 32, temperature of the intake air to be supplied to the engine 140 is controlled to the target temperature high-responsively and fuel consumption is improved.

In the above-described embodiments, the second heat exchanger 20b conducts heat exchange of the second refrigerant flowing through the sub-radiator 110. However, the second heat exchanger 20b may be an air-conditioning evaporator. In this case, air-conditioning refrigerant is the second refrigerant.

Namely, the second refrigerant is air-conditioning refrigerant that is cooled by heat exchange at the evaporator (second heat exchanger) 20b in a refrigerant recirculation system of an air-conditioning cycle.

According to such an intake air control system, advantages similar to those in the above-described intake air control system can be achieved.

Note that the low temperature side heat exchanger 20b may include a heat storage material 20c (see FIG. 12). The low temperature side heat exchanger 20b is always kept at low temperature by the heat storage material 20c, so that intake air can be cooled quickly at acceleration due to heat storage effect. Therefore, since the low temperature side heat exchanger 20b can be kept at low temperature (e.g. 40° C.) for a long time due to the inclusion of the heat storage material 20c, an adaptive time for regulating intake air temperature can be prolonged.

In addition, the intake air target temperature not only takes a fixed value as shown in FIG. 15, but also may take various forms. For example, optimal intake air target temperature can be calculated according to an engine rotational speed or an engine load based on a detected engine rotational speed or a detected throttle position. In this case, provided is a target temperature calculator that calculates the optimal intake air temperature based on an engine rotational speed, based on an engine load, or based on both of an engine rotational speed and an engine load, and then stores it in a memory device.

Although the present invention is explained based on the above-described embodiments, the above-described embodiments do not limit the present invention. According to the above disclosure, various alternative embodiments and operational techniques may become apparent to a person having ordinary skill in the art.

The present invention may include various embodiments and so on that are not described here. Therefore, the present invention is limited only by proper invention-defining matters in claims based on the above disclosure.

The invention claimed is:

1. A charge air cooling system comprising:
an internal combustion engine connected to a supercharger;
a first heat exchanger for cooling a first refrigerant;
a second heat exchanger for cooling a second refrigerant such that the second refrigerant is cooler than the first refrigerant;
a high temperature side cooling flow path through which the first refrigerant cooled by the first heat exchanger flows;
a low temperature side cooling flow path through which the second refrigerant cooled by the second heat exchanger flows;
a charge air cooler connected to the supercharger, the charge air cooler including:
a high temperature side heat exchanger that is provided on the high temperature side cooling flow path and cools, by the first refrigerant, supercharged intake air, and
a low temperature side heat exchanger that is provided on the low temperature side cooling flow path and cools, by the second refrigerant, intake air cooled by the high temperature side heat exchanger;
a bypass pathway, provided on an intake air flow passage downstream of the high temperature side heat exchanger, in parallel with the low temperature side heat exchanger; and
a thermostatic regulating valve, for controlling temperature of intake air to be supplied to the internal combustion engine, by regulating:
a flow rate of intake air that has exchanged heat at the low temperature side heat exchanger, and
a flow rate of intake air that has flowed through the bypass pathway,
wherein the first refrigerant is refrigerant of an internal combustion engine cooling system, and
wherein the second refrigerant is refrigerant of a refrigerant recirculation system of an air-conditioning cycle.

2. The charge air cooling system according to claim 1, further comprising a case that includes:
an induction pipe,
an eduction pipe, and
a flow path along which intake air introduced through the induction pipe and dischargeable through the eduction pipe flows,
wherein the high temperature side heat exchanger and the low temperature side heat exchanger are formed integrally and housed within the case,
wherein the high temperature side heat exchanger is disposed upstream of the flow path within the case, and
wherein the low temperature side heat exchanger is disposed downstream of the flow path within the case.

3. The charge air cooling system according to claim 1, wherein a temperature of the second refrigerant is such that intake air to be supplied to an internal combustion engine is coolable by the second refrigerant so as to have an intake air temperature that is a target temperature.

4. The charge air cooling system according to claim 1, wherein a condenser for cooling air-conditioning refrigerant is disposed within a tank of the second heat exchanger, and
wherein the air-conditioning refrigerant is cooled by the second refrigerant flowing through the low temperature side cooling flow path.

5. A charge air cooling system comprising a charge air cooler according to claim 1,
wherein a first EGR cooler is provided on the high temperature side cooling flow path, and a second EGR cooler is provided on the low temperature side cooling flow path.

6. The charge air cooling system according to claim 5, wherein the first EGR cooler and the second EGR cooler are formed integrally.

7. The charge air cooling system according to claim 1, wherein the thermostatic regulating valve regulates the flow rate of intake air that has exchanged heat at the low temperature side heat exchanger and the flow rate of intake air that has flowed through the bypass pathway according to intake air target temperature based on fuel consumption.

8. The charge air cooling system according to claim 1, further comprising a switching valve disposed upstream of the high temperature side heat exchanger,
wherein one of compressed intake air compressed by a supercharger and natural intake air that did not flow through the supercharger is selectively supplied to the high temperature side heat exchanger by the switching valve.

9. The charge air cooling system according to claim 8, wherein the switching valve is controllable to:
supply the natural intake air during a period before a switching point while an intake air pressure of the compressed intake air is lower than an intake air pressure of the natural intake air after acceleration is started, or
supply the compressed intake air during a period after the switching point while the intake air pressure of the compressed intake air is higher than the intake air pressure of the natural intake air after acceleration is started.

10. The charge air cooling system according to claim 9, wherein the supercharger is a turbocharger, and
wherein the period before the switching point is an acceleration initial stage of the internal combustion engine supercharged by the turbocharger, a period while a turbine of the turbocharger does not rotate sufficiently, or a period while intake air takes on negative pressure.

11. The charge air cooling system according to claim 1, wherein the low temperature side heat exchanger includes a heat storage material.

* * * * *